(12) United States Patent
Hirai

(10) Patent No.: US 11,907,477 B2
(45) Date of Patent: Feb. 20, 2024

(54) DISPLAY SYSTEM AND CONTROL METHOD FOR DISPLAY DEVICE

(71) Applicant: PANASONIC INTELLECTUAL PROPERTY MANAGEMENT CO., LTD., Osaka (JP)

(72) Inventor: Atsushi Hirai, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/102,954

(22) Filed: Jan. 30, 2023

(65) Prior Publication Data
US 2023/0195262 A1 Jun. 22, 2023

Related U.S. Application Data

(60) Division of application No. 17/374,267, filed on Jul. 13, 2021, now Pat. No. 11,604,542, which is a
(Continued)

(30) Foreign Application Priority Data

Jan. 30, 2019 (JP) .................................. 2019-014144
Jan. 30, 2019 (JP) .................................. 2019-014145

(51) Int. Cl.
G06F 3/041 (2006.01)
G06F 3/044 (2006.01)
G09G 3/36 (2006.01)

(52) U.S. Cl.
CPC .......... G06F 3/04184 (2019.05); G06F 3/044 (2013.01); G06F 3/0412 (2013.01);
(Continued)

(58) Field of Classification Search
CPC .............. G06F 3/0412; G06F 3/04166; G06F 3/04184; G06F 3/044; G06F 3/0446;
(Continued)

(56) References Cited

U.S. PATENT DOCUMENTS 9,041,636 B2 5/2015 Fujioka et al.
9,285,904 B2 3/2016 Kida et al.
(Continued)

FOREIGN PATENT DOCUMENTS

CN 102265245 4/2014
CN 106657516 5/2017
(Continued)

OTHER PUBLICATIONS

International Search Report (ISR) from International Searching Authority (Japan Patent Office) in International Pat. Appl. No. PCT/JP2020/002025, dated Mar. 31, 2020, along with an English language translation.
(Continued)

*Primary Examiner* — Hong Zhou
(74) *Attorney, Agent, or Firm* — Greenblum & Bernstein, P.L.C.

(57) ABSTRACT

In a display system, a display device includes a plurality of gate lines, a plurality of source lines, and a plurality of common electrodes used for both image display and touch detection. A control device controls the display device. The control device includes a drive circuit that generates a gate signal as a sine wave, and outputs the gate signal to the plurality of gate lines.

13 Claims, 22 Drawing Sheets

Related U.S. Application Data continuation of application No. PCT/JP2020/002025, filed on Jan. 22, 2020.

(52) U.S. Cl.
CPC ....... *G09G 3/36* (2013.01); *G09G 2310/0243* (2013.01); *G09G 2310/06* (2013.01); *G09G 2310/08* (2013.01)

(58) Field of Classification Search
CPC .......... G06F 3/0443; G09G 2310/0243; G09G 2310/06; G09G 2310/08; G09G 3/36
See application file for complete search history.

(56) References Cited

U.S. PATENT DOCUMENTS

| | | | |
|---|---|---|---|
| 9,395,832 B2 | 7/2016 | Kida et al. | |
| 10,042,470 B2 | 8/2018 | Shin et al. | |
| 2008/0158180 A1* | 7/2008 | Krah | G06F 3/048 345/173 |
| 2010/0141613 A1 | 6/2010 | Sonobe | |
| 2011/0227890 A1 | 9/2011 | Lee | |
| 2012/0162134 A1* | 6/2012 | Chen | G09G 3/3648 345/174 |
| 2012/0262390 A1* | 10/2012 | Kida | G06F 3/0412 345/173 |
| 2013/0286302 A1 | 10/2013 | Fujioka et al. | |
| 2014/0253485 A1 | 9/2014 | Kida et al. | |
| 2015/0091865 A1 | 4/2015 | Funayama | |
| 2015/0185956 A1 | 7/2015 | Takayama et al. | |
| 2016/0065890 A1 | 3/2016 | Miura et al. | |
| 2017/0300165 A1 | 10/2017 | Shin et al. | |
| 2018/0188882 A1* | 7/2018 | Kang | G06F 3/04184 |
| 2018/0261147 A1* | 9/2018 | Lin | G06F 3/0412 |

FOREIGN PATENT DOCUMENTS

| | | |
|---|---|---|
| CN | 107300994 | 10/2017 |
| JP | 2012-221423 | 11/2012 |
| WO | 2012/096259 | 7/2012 |
| WO | 2018/123813 | 7/2018 |

OTHER PUBLICATIONS

Office Action from China National Intellectual Property Administration (CNIPA) in Chinese Patent Application No. 202080009346.1, dated Mar. 30, 2022, together with an English language translation.

Office Action from Japan Patent Office (JPO) in Japanese Patent Appl. No. 2020-569512, dated Aug. 22, 2023, together with an English translation.

\* cited by examiner

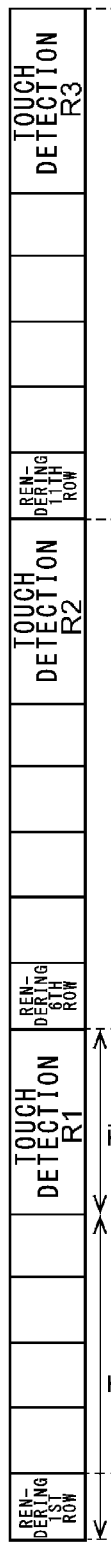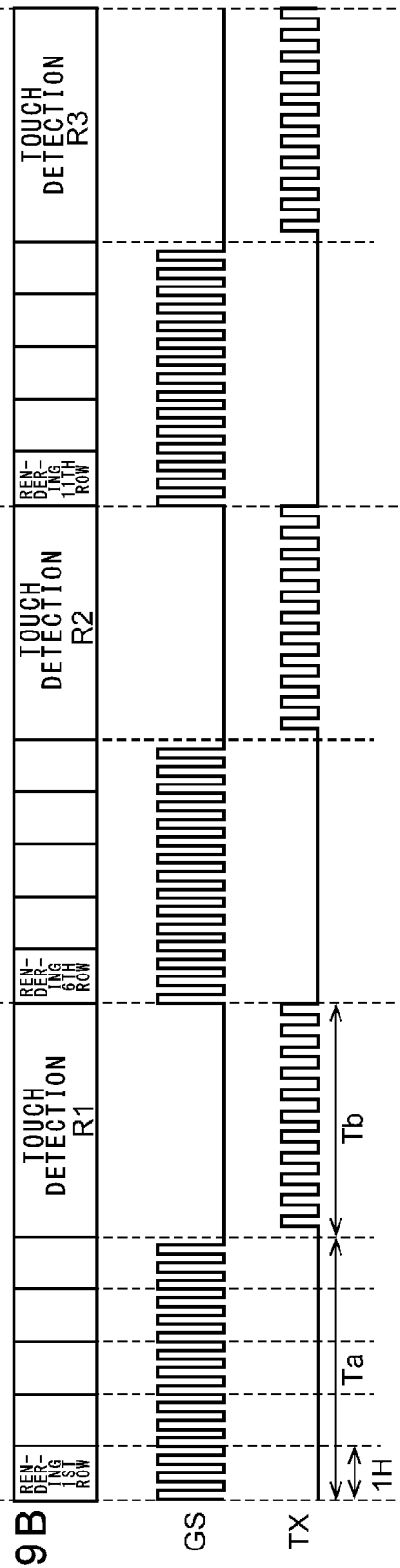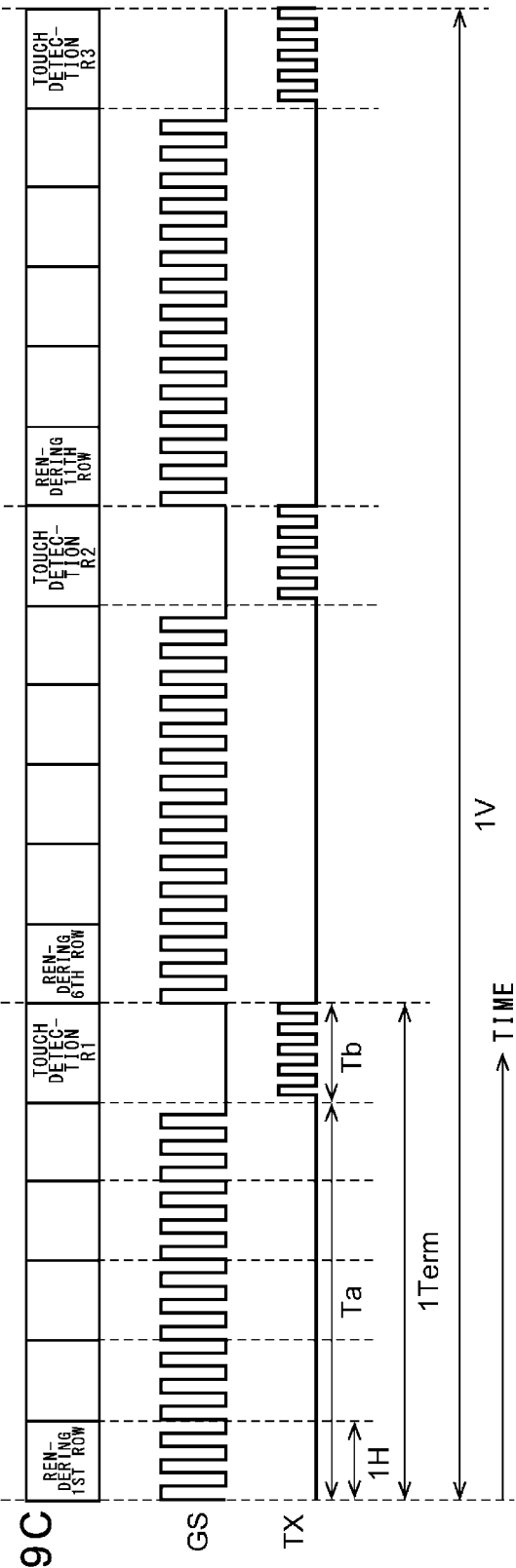

DISPLAY SYSTEM AND CONTROL METHOD FOR DISPLAY DEVICE

CROSS REFERENCE TO RELATED APPLICATIONS

This is a divisional of U.S. patent application Ser. No. 17/374,267, filed Jul. 13, 2021, which is a continuation of International Pat. Appl. No. PCT/JP2020/002025, filed Jan. 22, 2020, which claims priority to Japanese Pat. Appl. No. 2019-014144, filed Jan. 30, 2019, and to Japanese Pat. Appl. No. 2019-014145, filed Jan. 30, 2019. The entire disclosure of each of the above-identified applications, including the specification, drawings, and claims, is incorporated herein by reference in its entirety.

CROSS-REFERENCE TO RELATED APPLICATIONS

This application is a Continuation of International Application No. PCT/JP2020/002025, filed on Jan. 22, 2020, which in turn claims the benefit of Japanese Application No. 2019-014144, filed on Jan. 30, 2019, and Japanese Application No. 2019-014145, filed on Jan. 30, 2019, the disclosures of which Applications are incorporated by reference herein.

BACKGROUND

1. Field

The present disclosure relates to a control device for a display device that includes multiple common electrodes used for both image display and touch detection. The present disclosure also relates to a control method for a display device and to a display system.

2. Description of the Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.
Patent Literature 1: WO 2018/123813

SUMMARY

For in-cell display devices, further improvement has been required.

To solve the problem above, a control device according to one aspect of the present disclosure controls a display device including multiple gate lines and multiple common electrodes used for both image display and touch detection. The control device includes: a first acquirer that acquires a specific frequency to be avoided; a second acquirer that acquires a drive frequency of a gate signal supplied to the multiple gate lines; and a changing unit that changes the drive frequency when the specific frequency and the drive frequency thus acquired satisfy a changing condition.

Another aspect of the present disclosure is a control method. The control method is used for a display device including multiple gate lines and multiple common electrodes used for both image display and touch detection. The control method includes: first acquiring of acquiring a specific frequency to be avoided; second acquiring of acquiring a drive frequency of a gate signal supplied to the multiple gate lines; and changing the drive frequency when the specific frequency and the drive frequency thus acquired satisfy a changing condition.

Yet another aspect of the present disclosure is a display system. The display system includes: a display device that includes multiple gate lines and multiple common electrodes used for both image display and touch detection; and a control device that controls the display device. The control device includes: a first acquirer that acquires a specific frequency to be avoided; a second acquirer that acquires a drive frequency of a gate signal supplied to the multiple gate lines; and a changing unit that changes the drive frequency when the specific frequency and the drive frequency thus acquired satisfy a changing condition.

A control device according to still yet another aspect of the present disclosure controls a display device including multiple gate lines, multiple source lines, and multiple common electrodes used for both image display and touch detection. The control device includes: a first acquirer that acquires a specific frequency to be avoided; a second acquirer that acquires a frequency of a control signal used to control the display device; and a changing unit that changes the frequency of the control signal when the specific frequency is an integral multiple of the frequency of the control signal.

Still yet another aspect of the present disclosure is a control method. The control method is used for a display device including multiple gate lines, multiple source lines, and multiple common electrodes used for both image display and touch detection. The control method includes: first acquiring of acquiring a specific frequency to be avoided; second acquiring of acquiring a frequency of a control signal used to control the display device; and changing the frequency of the control signal when the specific frequency is an integral multiple of the frequency of the control signal.

Still yet another aspect of the present disclosure is a display system. The display system includes: a display device including multiple gate lines, multiple source lines, and multiple common electrodes used for both image display and touch detection; and a control device that controls the display device. The control device includes: a first acquirer that acquires a specific frequency to be avoided; a second acquirer that acquires a frequency of a control signal used to control the display device; and a changing unit that changes the frequency of the control signal when the specific frequency is an integral multiple of the frequency of the control signal.

A control device according to still yet another aspect of the present disclosure controls a display device including multiple gate lines and multiple common electrodes used for both image display and touch detection. The control device includes: a gate signal generator that generates a gate signal as a sine wave; and an output unit that outputs the gate signal generated by the gate signal generator to the multiple gate lines.

Still yet another aspect of the present disclosure is a control method. The control method is used for a display device including multiple gate lines and multiple common electrodes used for both image display and touch detection. The control method includes: generating a gate signal as a sine wave; and outputting the gate signal generated in the generating to the multiple gate lines.

A further aspect of the present disclosure is a display system. The display system includes: a display device that includes multiple gate lines and multiple common electrodes used for both image display and touch detection; and a control device that controls the display device. The control device includes: a gate signal generator that generates a gate signal as a sine wave; and an output unit that outputs the gate signal generated by the gate signal generator to the multiple gate lines.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 9A is a diagram that shows timings in one frame before display periods are changed, FIG. 9B is a diagram that shows timings of the gate signal and the touch drive signal when each display period is shortened, and FIG. 9C is a diagram that shows timings of the gate signal and the touch drive signal when each display period is lengthened;

DETAILED DESCRIPTION

Figure 1:
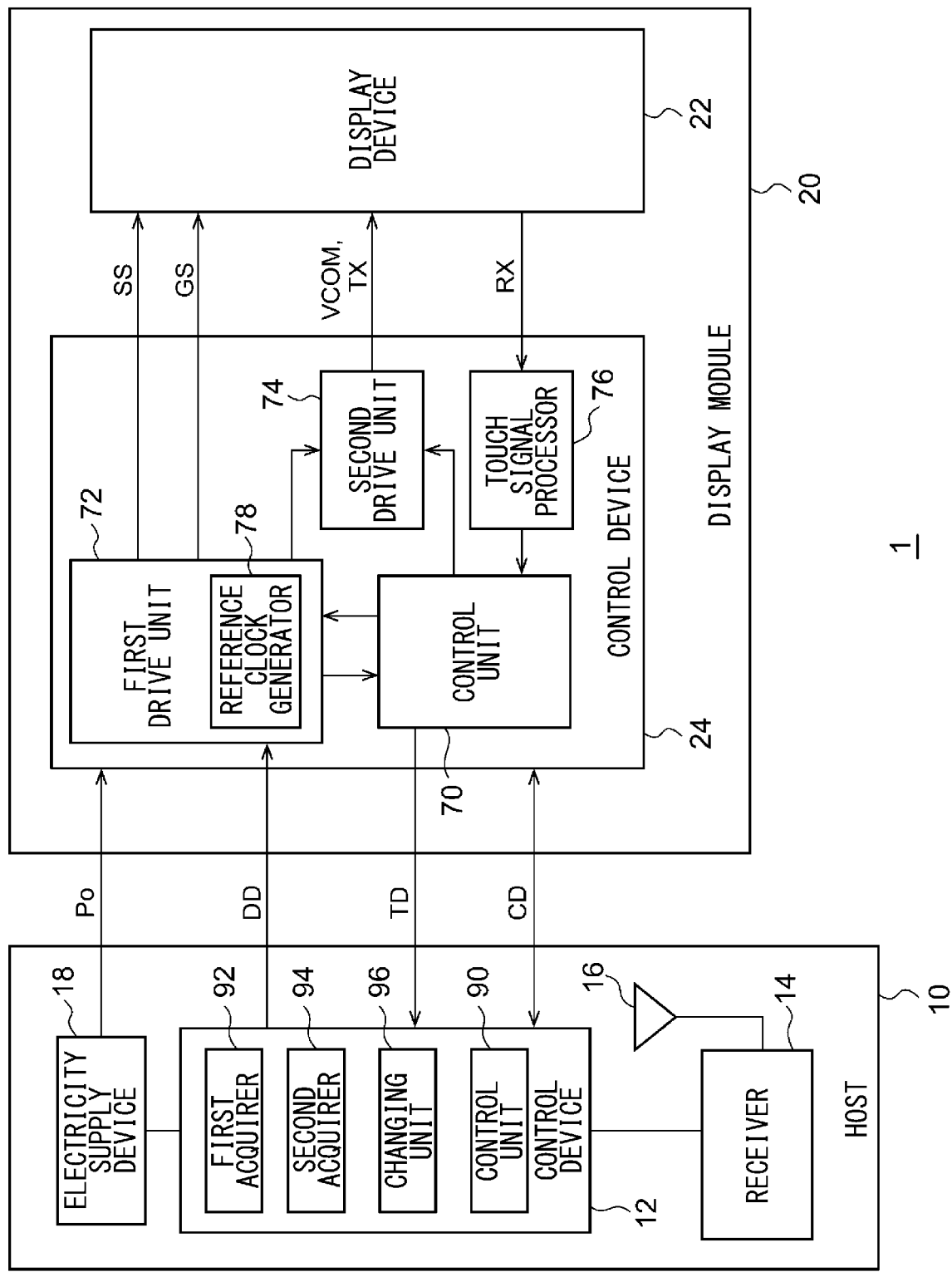
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments is given, the base findings will be described. In the display device of Patent Literature 1, electrodes are not provided on the side closer to the viewer than the common electrodes. Accordingly, the display device is more likely to emit noise than an out-cell display device, in which touch sensor electrodes are arranged on the side closer to the viewer than the common electrodes. The inventor has found that emitted noise may affect the reception of wireless signals at a receiver near the display device. The amount of noise emittance can be reduced by providing a transparent electrode for shielding on the side closer to the viewer than the common electrodes; however, accuracy and sensitivity of touch position detection is degraded. Therefore, restraining influence on the receiver without degrading the accuracy and sensitivity of touch position detection is desired.

In the process of analyzation and verification of causes of noise emitted from a display device, the inventor has found that the influence of noise caused by a gate signal is relatively large, among a number of causes of noise. Accordingly, the inventor has found a problem that, to reduce the influence on the reception of wireless signals at a receiver, measures against noise caused by a gate signal are necessary.

The inventor provides the present disclosure with a realization of such a situation, and a purpose thereof is to provide a technology for enabling a display device that includes multiple common electrodes used for both image display and touch detection to have less influence on the reception at a receiver, without degrading the accuracy and sensitivity of touch position detection.

First Embodiment

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

FIG. 1 is a block diagram of a display system 1 according to the first embodiment. Although an example will be described in which the display system 1 is a vehicle-mounted display system 1 mounted on a vehicle, such as an automobile, the application is not particularly limited. The display system 1 may also be used for a mobile device.

The display system 1 includes a host 10 and a display module 20. The host 10 performs various functions, such as radio, car navigation, and Bluetooth (registered trademark)

communication, and controls the display module 20. The host 10 includes a control device 12, a receiver 14, an antenna 16, and an electricity supply device 18.

The control device 12 may be a CPU, for example, and also called a host CPU. The control device 12 controls the receiver 14 and the electricity supply device 18. Also, the control device 12 supplies image data DD and control data CD to the display module 20 and controls the display module 20 based on such data. The control data CD includes information regarding a frequency for image display appropriate for the display image. The configuration of the control device 12 will be described later.

The receiver 14 receives wireless signals via the antenna 16. The receiver 14 has at least one of the radio receiving function, GPS receiving function, or Bluetooth receiving function, for example. When the receiver 14 has multiple receiving functions, the antenna 16 may include an antenna for each receiving function.

The electricity supply device 18 may include a DC/DC convertor, for example, and supplies electricity Po to the display module 20.

The display module 20 includes a display device 22 and a control device 24. The display module 20 may be used as a center display on which a car navigation screen or the like is displayed within a vehicle cabin, for example.

The display device 22 is an in-cell liquid crystal display device of an in plane switching (IPS) type and capable of detecting a touch position. The configuration of the display device 22 may be a well-known configuration as described below, for example.

Figure 2:
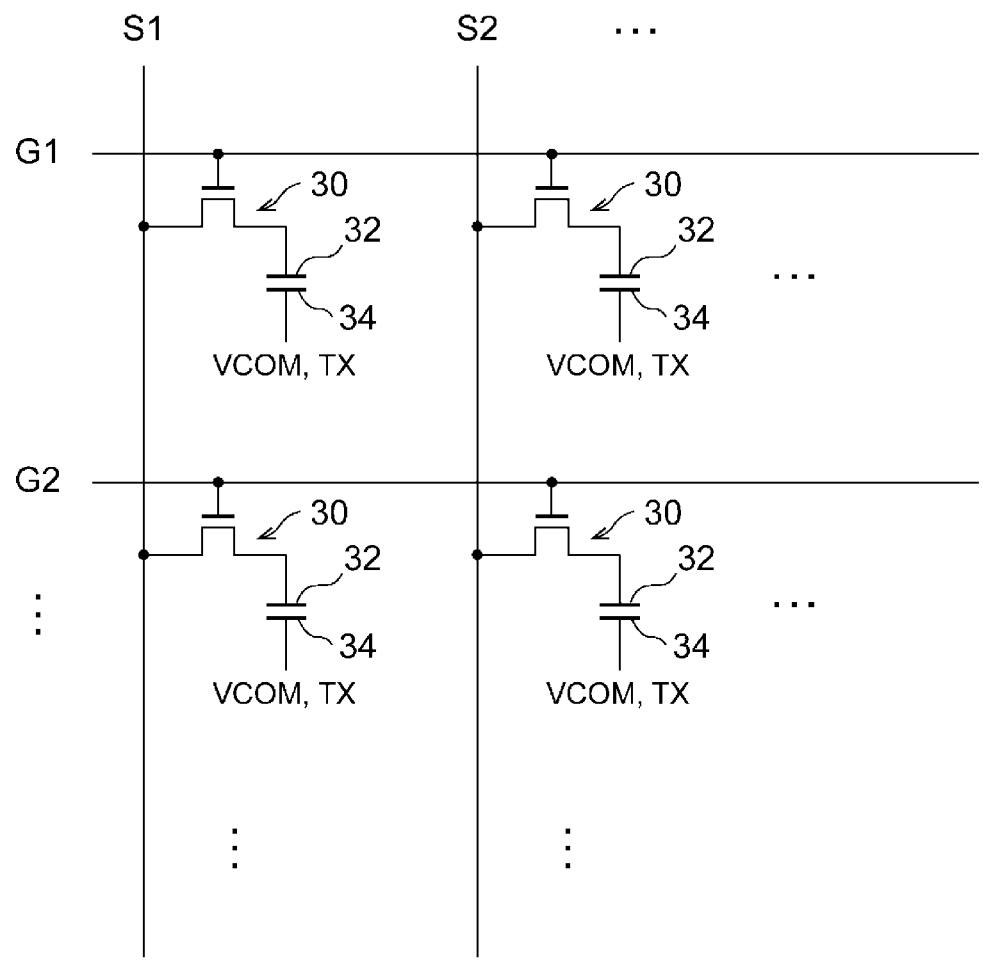
FIG. 2 is a diagram that schematically shows a circuit configuration of a display device shown in FIG. 1.

FIG. 2 schematically shows a circuit configuration of the display device 22 shown in FIG. 1. FIG. 2 also shows schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection.

Figure 3:
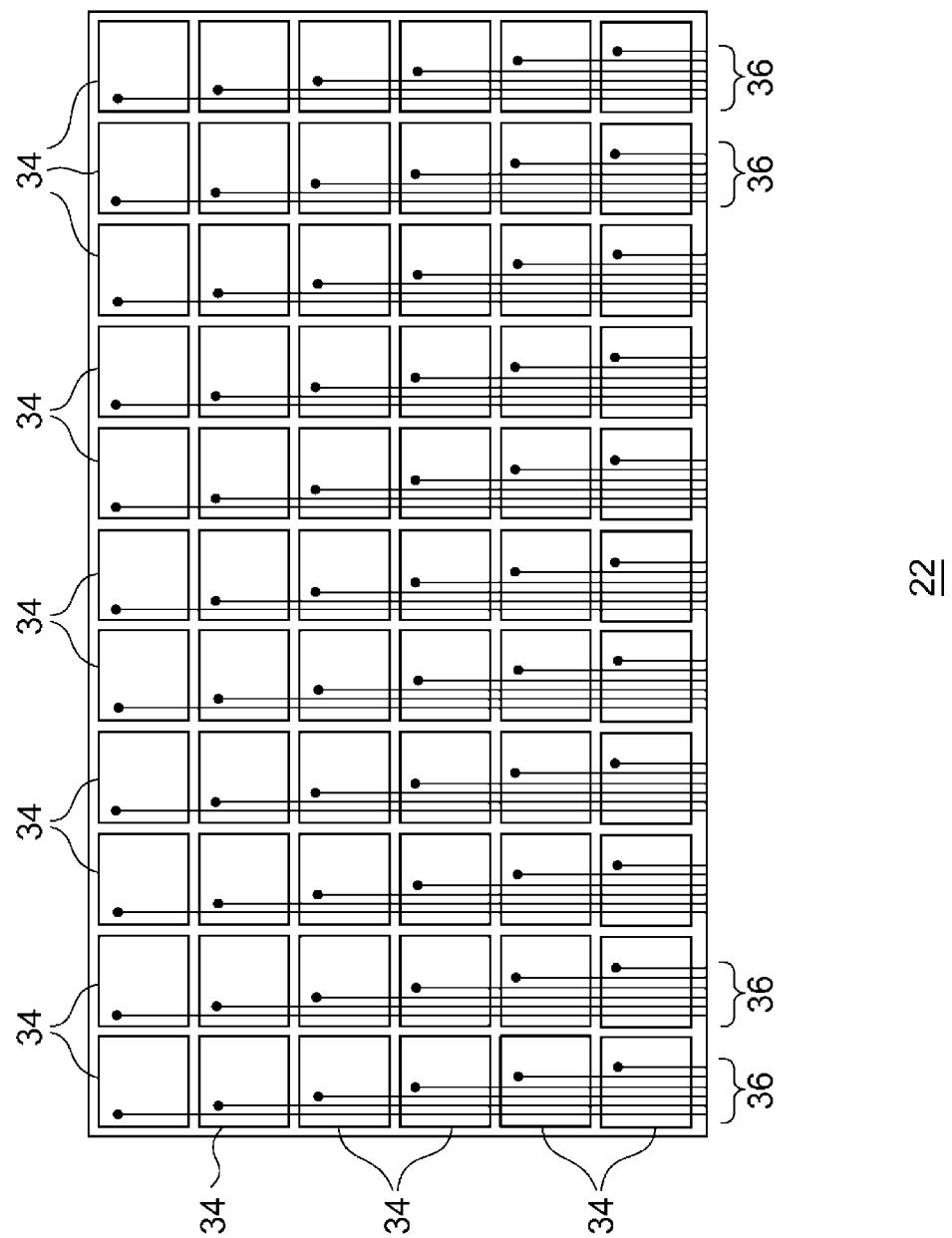
FIG. 3 is a top view that shows arrangement of common electrodes shown in FIG. 2.

FIG. 3 is a top view that shows arrangement of common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

Figure 4:
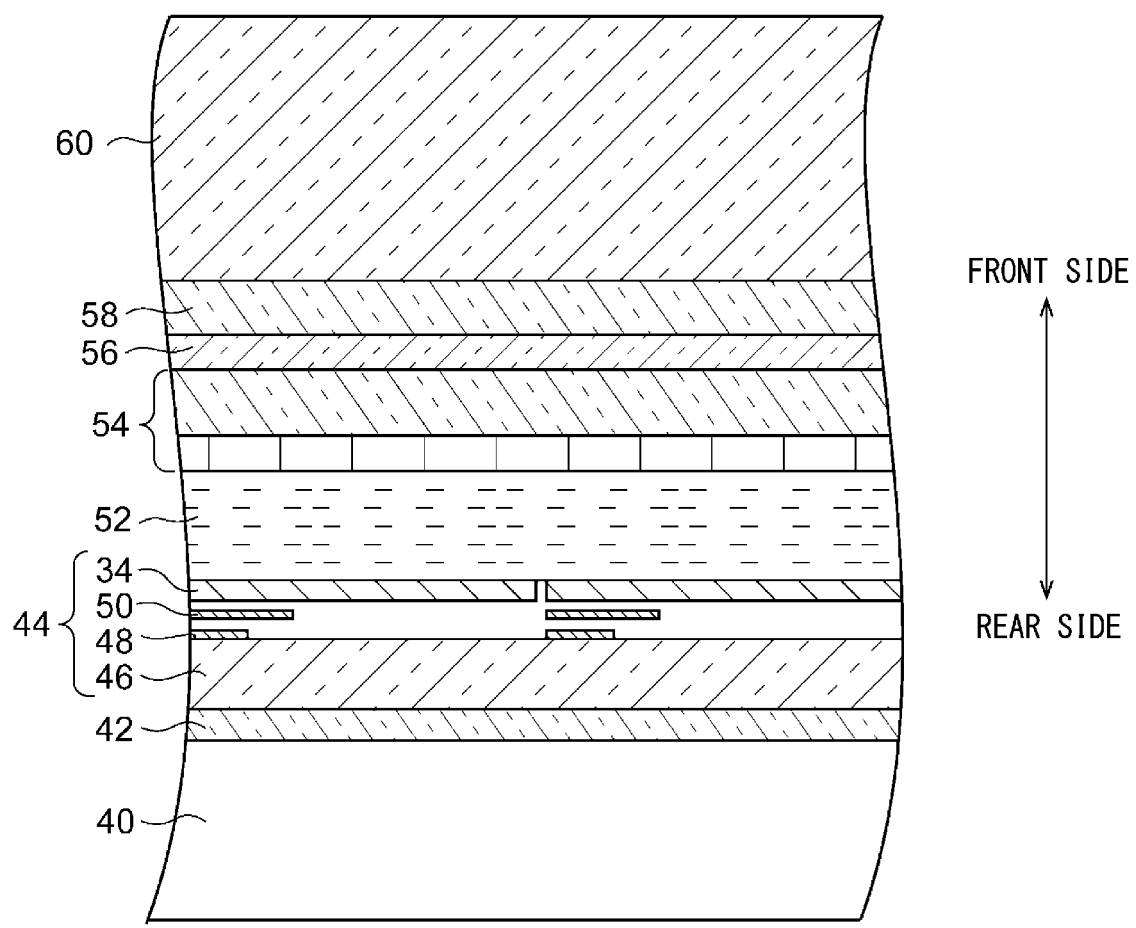
FIG. 4 is a longitudinal sectional view of the display device shown in FIG. 1.

FIG. 4 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing a transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens or the like.

In the display device 22, electrodes are not provided on the front side of the common electrodes 34. Accordingly, as described previously, the display device 22 is more likely to emit noise, such as harmonic components of a gate signal GS, toward the front side, compared to the configuration in which electrodes are arranged on the front side of the common electrodes 34.

The description now returns to FIG. 1. The control device 24 may be configured as an IC, for example, and controls the display device 22 based on the control data CD and the image data DD from the host 10. The control device 24 includes a control unit 70, a first drive unit 72, a second drive unit 74, and a touch signal processor 76. The control unit 70 may be a control circuit, the first drive unit 72 may be a first drive circuit, the second drive unit 74 may be a second drive circuit, and the touch signal processor 76 may be a touch detection circuit.

The control unit 70 may be configured as a microcomputer, for example, and controls signal generation timings of the first drive unit 72 and the second drive unit 74, and the like. Based on the information regarding a frequency for image display included in the control data CD from the host 10, the control unit 70 outputs, to the first drive unit 72, an instruction for setting a frequency appropriate for the display image.

The first drive unit 72 includes a reference clock generator 78 that generates a reference clock signal having a frequency that matches the instruction for setting a frequency. The first drive unit 72 also generates, under the control of the control unit 70, a source signal SS in synchronization with the generated reference clock signal, based on the image data DD from the host 10. The first drive unit 72 also generates, under the control of the control unit 70, a gate signal GS in synchronization with the generated reference clock signal. The first drive unit 72 generates a gate signal GS as a square wave having the same frequency as the reference clock signal.

The first drive unit 72 supplies the source signal SS serially to multiple source lines in the display device 22 and also supplies the gate signal GS serially to multiple gate lines in the display device 22.

The reference clock generator 78 also supplies the reference clock signal to the second drive unit 74. The second drive unit 74 generates a reference voltage VCOM, which is a predetermined fixed voltage, and a touch drive signal TX under the control of the control unit 70. The second drive unit 74 generates a touch drive signal TX as a square wave that has the same frequency as the reference clock signal and is synchronized with the reference clock signal. The touch drive signal TX has smaller amplitude than the gate signal GS. Through the signal lines 36 shown in FIG. 3, the second drive unit 74 supplies the reference voltage VCOM or the touch drive signal TX to the multiple common electrodes 34 of the display device 22.

The touch signal processor 76 receives touch detection signals RX when the touch drive signal TX is supplied to the common electrodes 34 and performs detection of a touch position based on the touch detection signals RX. The touch signal processor 76 outputs information regarding the touch position thus detected to the control unit 70.

Based on the information regarding the touch position from the touch signal processor 76, the control unit 70 derives coordinate data TD of the touch position and outputs the coordinate data TD to the control device 12 of the host 10. The control device 12 performs various processes based on the coordinate data TD.

FIGS. 5A-5F are diagrams used to describe an example of rendering and touch detection for one frame of a display image in the display system 1 shown in FIG. 1. FIG. 6 shows timings of a gate signal GS and a touch drive signal TX in one frame corresponding to FIGS. 5A-5F. In the interest of clarity, it is assumed here that the screen is constituted by fifteen rows.

Figure 5A:
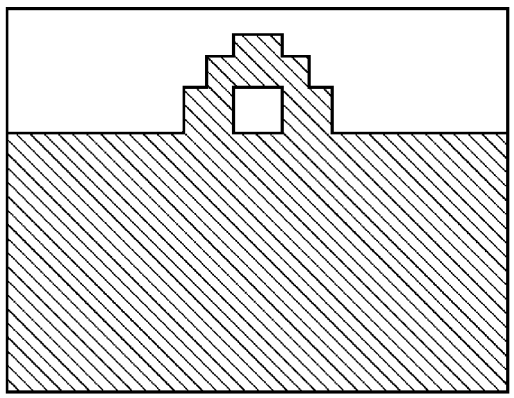
FIGS. 5A-5F are diagrams used to describe an example of rendering and touch detection for one frame of a display image in the display system shown in FIG. 1.
Figure 6:
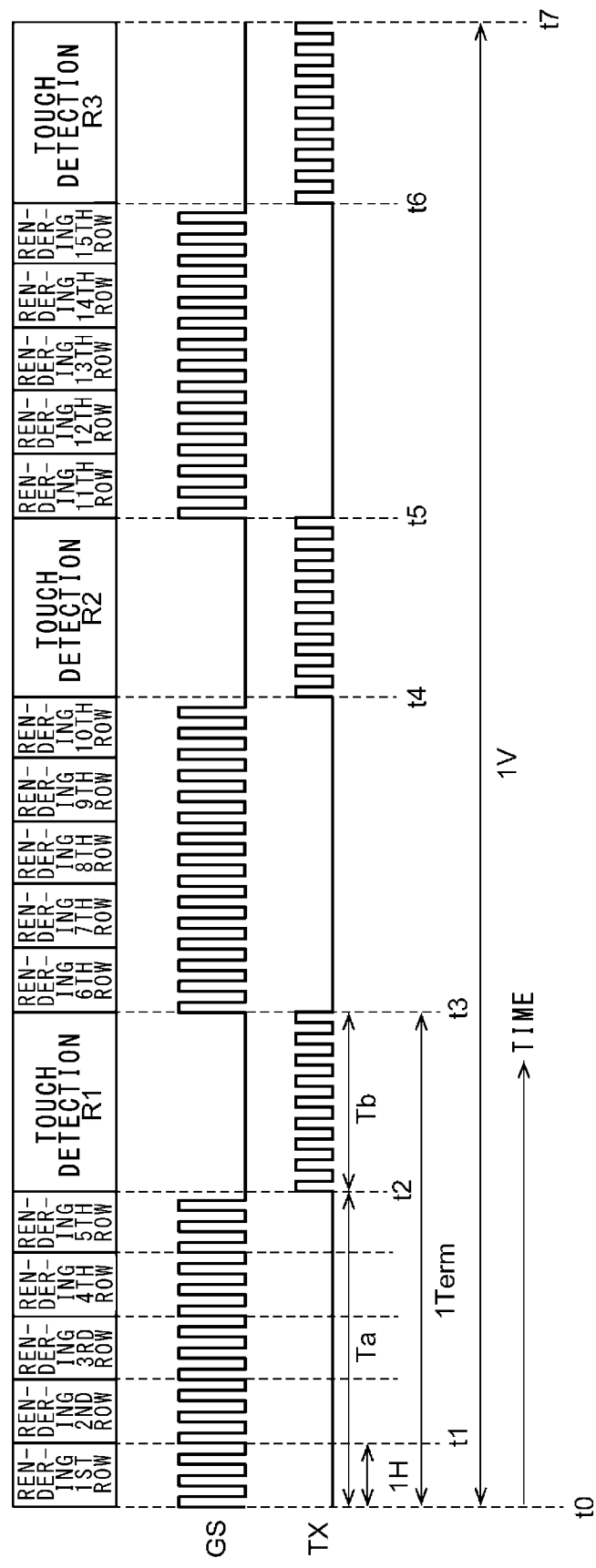
FIG. 6 is a diagram that shows timings of a gate signal and a touch drive signal in one frame corresponding to FIGS. 5A-5F.

First, as shown in FIG. 5A, the five rows from the top of one frame are rendered. At the time, within a horizontal scanning period (1H) from the time t0 to the time t1, the gate signal GS includes three pulses supplied to the gate line G1 corresponding to the first row, as shown in FIG. 6. The three pulses are provided for red pixels, green pixels, and blue pixels in sequence, for example. After the time t1, the gate signal GS is serially supplied to the gate lines corresponding to the second row, third row, fourth row, and fifth row in the same way, and the supply of the gate signal GS is stopped at the time t2. During a display period Ta from t0 to t2, the reference voltage VCOM, not illustrated, is supplied to the multiple common electrodes 34 while the touch drive signal TX is not supplied.

Figure 5B:
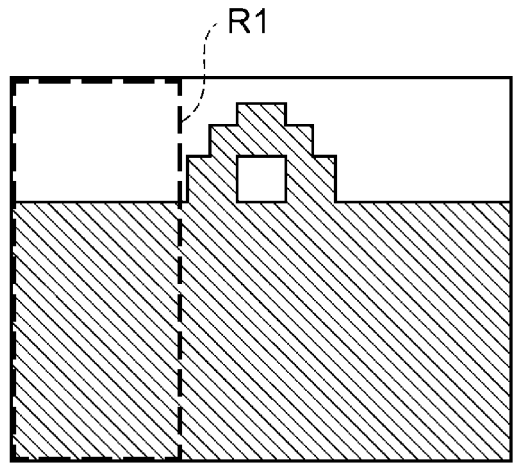

Subsequently, as shown in FIG. 5B, touch detection in a region R1, which is one third from the left of the screen, is performed. At the time, as shown in FIG. 6, the touch drive signal TX is supplied to the multiple common electrodes 34 of the entire screen during a touch detection period Tb from the time t2 to the time t3. The touch signal processor 76 processes the touch detection signals RX from the multiple common electrodes 34 in the region R1. During the touch detection period Tb, the gate signal GS is not supplied to the multiple gate lines. The period from the time t0 to the time t3 is defined as one term (hereinafter, referred to as a sub-frame period).

Figure 5C:
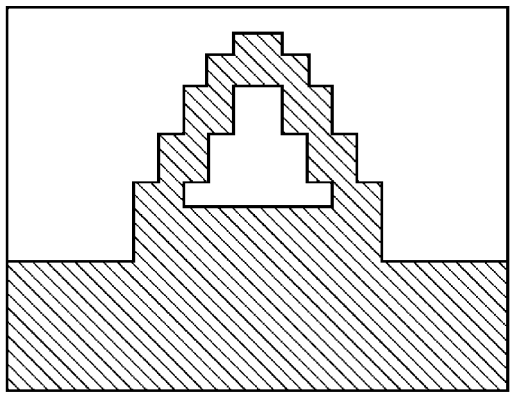

Subsequently, as shown in FIG. 5C, the sixth through tenth rows are rendered. At the time, as shown in FIG. 6, the gate signal GS is serially supplied to the gate lines corresponding to the sixth through tenth rows during the display period Ta from the time t3 to the time t4, and the supply of the gate signal GS is stopped at the time t4.

Figure 5D:
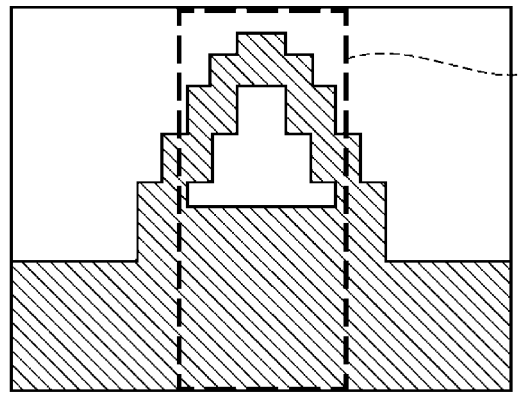

Subsequently, as shown in FIG. 5D, touch detection in a region R2, which is one third in the middle of the screen, is performed. At the time, as shown in FIG. 6, the touch drive signal TX is supplied to the multiple common electrodes 34 of the entire screen during the touch detection period Tb from the time t4 to the time t5. The touch signal processor 76 processes the touch detection signals RX from the multiple common electrodes 34 in the region R2.

Figure 5E:
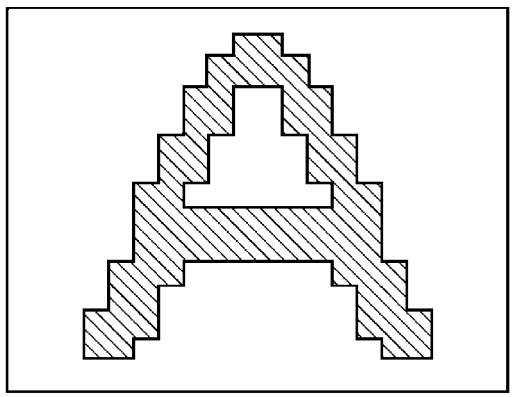

Subsequently, as shown in FIG. 5E, the eleventh through fifteenth rows are rendered, which means that the rendering of one frame is completed. At the time, as shown in FIG. 6, the gate signal GS is serially supplied to the gate lines corresponding to the eleventh through fifteenth rows during the display period Ta from the time t5 to the time t6, and the supply of the gate signal GS is stopped at the time t6.

Figure 5F:
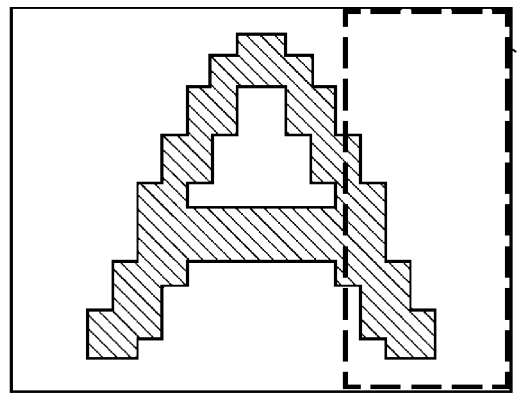

Subsequently, as shown in FIG. 5F, touch detection in a region R3, which is one third from the right of the screen, is performed. At the time, as shown in FIG. 6, the touch drive signal TX is supplied to the multiple common electrodes 34 of the entire screen during the touch detection period Tb from the time t6 to the time t7. The touch signal processor 76 processes the touch detection signals RX from the multiple common electrodes 34 in the region R3.

The period from the time t0 to the time t7 is defined as one frame (1V). Within one frame, the gate signal GS for one screen of a display image is supplied to the multiple gate lines, and the touch drive signal TX used for touch detection of at least one screen is supplied to the multiple common electrodes 34.

The period of one frame is divided into multiple sub-frame periods. The number of sub-frame periods included in one frame is not limited to three. The number of sub-frame periods within one frame may be different from the number of regions for touch detection in one screen. For example, one frame may be divided into six sub-frame periods, touch detection may be performed in three regions, and touch detection may be performed twice in each region within one frame.

The description now returns to FIG. 1. The control device 12 of the host 10 includes a control unit 90, a first acquirer 92, a second acquirer 94, and a changing unit 96.

The control unit 90 controls the receiver 14 and outputs, to the first acquirer 92, the frequency of a wireless signal received at the receiver 14. For example, the control unit 90 may activate a radio receiving function of the receiver 14 in response to a user's operation, control the reception frequency of the receiver 14 to a frequency selected by the user, and output the reception frequency. The control unit 90 may also activate a GPS receiving function in response to a user's operation and output the reception frequency for the GPS. The control unit 90 may also activate a Bluetooth function in response to a user's operation and output the reception frequency for Bluetooth.

The first acquirer 92 acquires the frequency of the wireless signal output from the control unit 90, as a specific frequency to be avoided. The second acquirer 94 acquires a drive frequency of the gate signal GS from the control unit 70 of the control device 24. The specific frequency is higher than the drive frequency of the gate signal GS and may be a frequency in a range from a hundred kHz to several GHz, for example.

When the specific frequency and the drive frequency of the gate signal GS thus acquired satisfy a changing condition, the changing unit 96 changes the drive frequency of the gate signal GS. More specifically, when the specific frequency is an integral multiple of the drive frequency of the gate signal GS, the changing unit 96 derives a drive frequency of the gate signal GS such that the specific frequency differs from an integral multiple of the drive frequency of the gate signal GS. The changing unit 96 outputs, to the control unit 70 of the control device 24, a change instruction to change the drive frequency of the gate signal GS, including the derived drive frequency of the gate signal GS, so as to change the drive frequency of the gate signal GS.

Upon reception of the change instruction to change the drive frequency of the gate signal GS, the control unit 70 of the control device 24 allows the reference clock generator 78 to generate a reference clock signal that has a frequency as specified by the change instruction. Accordingly, the drive frequency of the gate signal GS in synchronization with the reference clock signal is changed, and the horizontal scanning period (1H) is also changed. At the time, the frequency of the touch drive signal TX is also changed, and the period of one frame is also changed.

Figure 7:
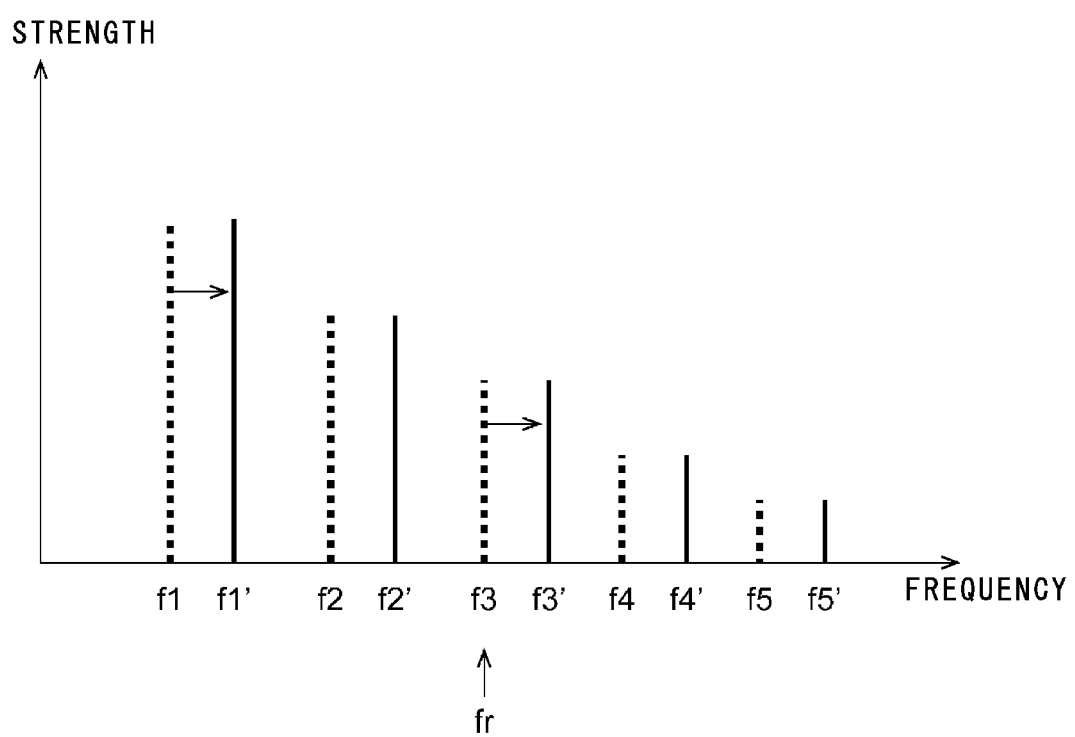
FIG. 7 is a diagram that schematically shows frequency components of a gate signal before and after the drive frequency of the gate signal is changed.

FIG. 7 schematically shows frequency components of a gate signal GS before and after the drive frequency of the gate signal GS is changed. Before the change of the drive frequency of the gate signal GS, the gate signal GS contains a fundamental wave component at a drive frequency f1 of the gate signal GS, a second-order harmonic component at a frequency f2, a third-order harmonic component at a frequency f3, a fourth-order harmonic component at a frequency f4, and a fifth-order harmonic component at a frequency f5. For example, it is assumed here that the frequency f3 is identical with a radio reception frequency fr. Accordingly, the specific frequency is three times the drive frequency of the gate signal GS. Therefore, the third-order harmonic component of the gate signal GS radiated from the front side of the display device 22 may interfere with radio waves received at the receiver 14, which may cause mixing of noise in audio from a radio, for example.

After the change of the drive frequency of the gate signal GS, the gate signal GS contains the fundamental wave component at a drive frequency f1' of the gate signal GS, the second-order harmonic component at a frequency f2', the third-order harmonic component at a frequency f3', the fourth-order harmonic component at a frequency f4', and the fifth-order harmonic component at a frequency f5'. The drive frequency f1' of the gate signal GS after the change is higher than the drive frequency f1 of the gate signal GS before the change. Accordingly, the frequency f3' is higher than the frequency f3, i.e., higher than the radio reception frequency fr. Therefore, even though the third-order harmonic component is radiated from the front side of the display device 22, interference with the radio waves received at the receiver 14 can be restrained.

Each of the configurations of the control device 12 and the control unit 70 may be implemented by a CPU or memory of any given computer, an LSI, or the like in terms of hardware, and by a memory-loaded program or the like in terms of software. In the present embodiment is shown a functional block configuration realized by cooperation thereof. Therefore, it will be understood by those skilled in the art that these functional blocks may be implemented in a variety of forms by hardware only or a combination of hardware and software.

There will now be described the overall operation of the display system 1 having the configuration set forth above.

Figure 8:
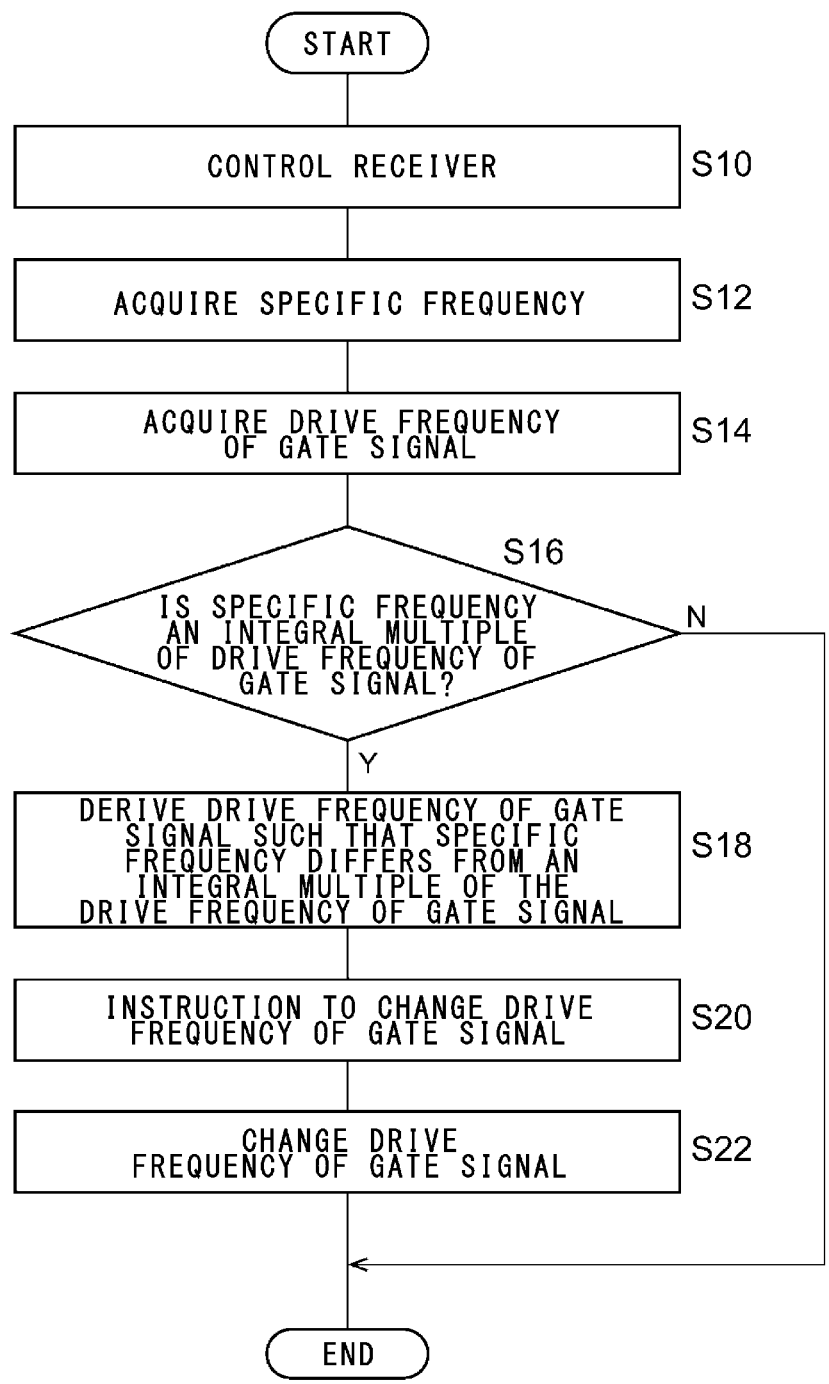
FIG. 8 is a flowchart that shows processing performed in the display system shown in FIG. 1.

FIG. 8 is a flowchart that shows processing performed in the display system 1 shown in FIG. 1. The processing shown in FIG. 8 is performed each time the control unit 90 of the control device 12 controls the receiver 14.

The control unit 90 controls the receiver 14 (S10), the first acquirer 92 acquires the specific frequency from the control unit 90 (S12), and the second acquirer 94 acquires the drive frequency of the gate signal GS from the control unit 70 (S14). When the specific frequency is not an integral multiple of the drive frequency of the gate signal GS (N at S16), the processing is terminated. When the specific frequency is an integral multiple of the drive frequency of the gate signal GS (Y at S16), the changing unit 96 derives a drive frequency of the gate signal GS such that the specific frequency differs from an integral multiple of the drive frequency of the gate signal GS (S18) and outputs, to the control unit 70, the change instruction to change the drive frequency of the gate signal GS (S20). The control unit 70 changes the drive frequency of the gate signal GS (S22).

According to the present embodiment, when the specific frequency is an integral multiple of the drive frequency of the gate signal GS, the drive frequency of the gate signal GS is changed. This restrains the interference of harmonics of the gate signal GS with a signal having the specific frequency, without adding an electrode for shielding in the display device 22. Therefore, the reception at the receiver 14 can be made less affected, without degrading the accuracy and sensitivity of touch position detection.

Second Embodiment

In the first embodiment, since the drive frequency of the gate signal GS is changed by changing the frequency of the reference clock signal, the period of one frame is also changed. However, the period of one frame may sometimes desirably be made unchanged. Accordingly, in the second embodiment, the drive frequency of the gate signal GS is changed without changing the frequency of the reference clock signal, so that the period of one frame is kept unchanged. In the following, description will be given mainly for the differences from the first embodiment.

The configuration of the display system 1 is the same as illustrated in FIG. 1. When the specific frequency and the drive frequency of the gate signal GS satisfy the changing condition, the changing unit 96 outputs, to the control unit 70 of the control device 24, the change instruction to change the drive frequency of the gate signal GS so as to change the drive frequency of the gate signal GS while the period of one frame is kept unchanged. More specifically, the changing unit 96 changes the proportions of the display period Ta and the touch detection period Tb while keeping the sub-frame period unchanged, and changes the drive frequency of the gate signal GS.

Upon reception of the change instruction to change the drive frequency of the gate signal GS, the control unit 70 of the control device 24 allows the first drive unit 72 to change the drive frequency of the gate signal GS. Accordingly, the first drive unit 72 changes the drive frequency of the gate signal GS and the frequency of horizontal scanning to a frequency as specified by the change instruction. The changing unit 96 keeps the frequency of the touch drive signal TX unchanged. Accordingly, the drive frequency of the gate signal GS is different from the frequency of the touch drive signal TX. Since the touch drive signal TX has smaller amplitude than the gate signal GS, keeping the frequency of the touch drive signal TX unchanged is less likely to affect the reception at the receiver 14.

FIG. 9A shows timings in one frame before the display periods Ta are changed. FIG. 9B shows timings of the gate signal GS and the touch drive signal TX when each display period Ta is shortened. FIG. 9C shows timings of the gate signal GS and the touch drive signal TX when each display period Ta is lengthened.

In the case of FIG. 9B, the changing unit 96 makes each display period Ta shorter and makes each touch detection period Tb longer, compared to the case of FIG. 9A. Since each display period Ta becomes shorter, the horizontal scanning period (1H) also becomes shorter, so that the drive frequency of the gate signal GS and the frequency of horizontal scanning become higher. The number of pulses in the touch drive signal TX within each touch detection period Tb may be kept unchanged or may be increased as shown in FIG. 9B. Increasing the number of pulses can improve the touch detection sensitivity.

In the case of FIG. 9C, the changing unit 96 makes each display period Ta longer and makes each touch detection period Tb shorter, compared to the case of FIG. 9A. Since each display period Ta becomes longer, the horizontal scanning period (1H) also becomes longer, so that the drive frequency of the gate signal GS and the frequency of horizontal scanning become lower.

According to the present embodiment, since the drive frequency of the gate signal GS is changed while the period of one frame is kept unchanged, the frame rate of the display image can be kept constant. Since each sub-frame period is also kept unchanged, touch detection can be performed with a constant period.

Third Embodiment

In the third embodiment, the configuration of the first embodiment is provided, and, in addition, an electromagnetic wave radiated from an external device is received at an antenna, and the frequency of the electromagnetic wave is set as the specific frequency. In the following, description will be given mainly for the differences from the first embodiment.

Figure 10:
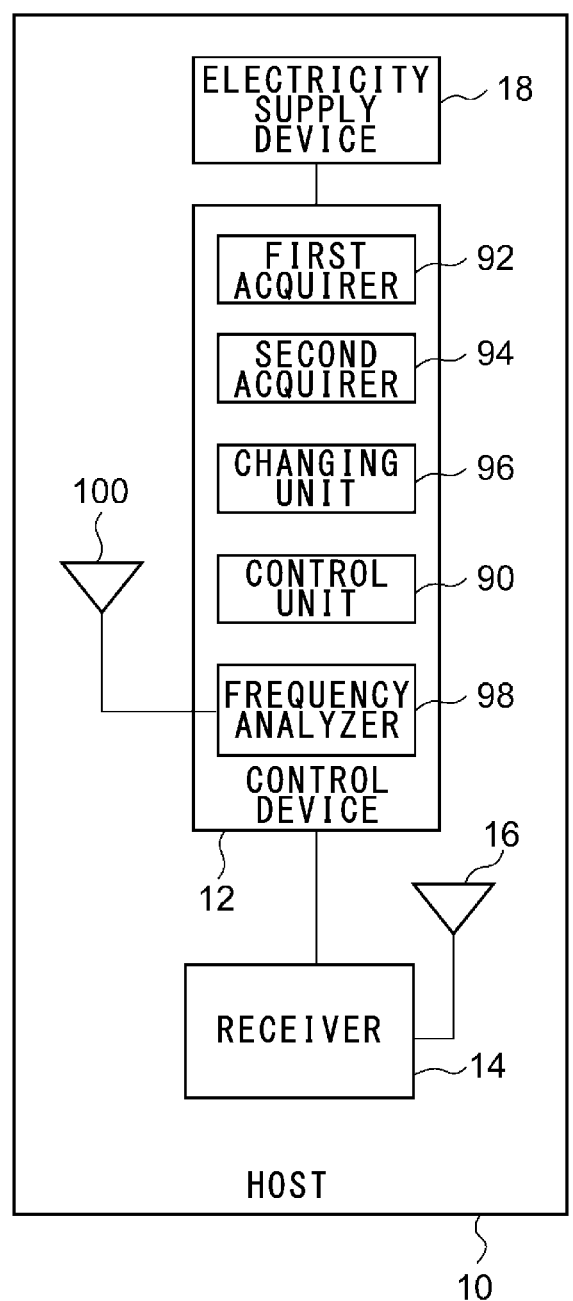
FIG. 10 is a block diagram of a host according to a third embodiment.

FIG. 10 is a block diagram of the host 10 according to the third embodiment. The host 10 further includes an antenna 100. The antenna 100 receives an electromagnetic wave radiated from an external device, which is not included in the display system 1. The external device may be a contactless battery charger mounted on a vehicle or a smart key for a vehicle, for example.

The control device 12 further includes a frequency analyzer 98. The frequency analyzer 98 analyzes the frequency of an electromagnetic wave received at the antenna 100 and outputs the frequency thus analyzed to the first acquirer 92. The frequency analyzer 98 outputs the frequency of a frequency component of which the magnitude is greater than or equal to a predetermined threshold and does not output the frequency of a frequency component of which the magnitude is smaller than the threshold. The threshold can be appropriately determined through experiments or the like.

The first acquirer 92 acquires, as the specific frequency, the frequency of the electromagnetic wave analyzed by the frequency analyzer 98.

Figure 11:
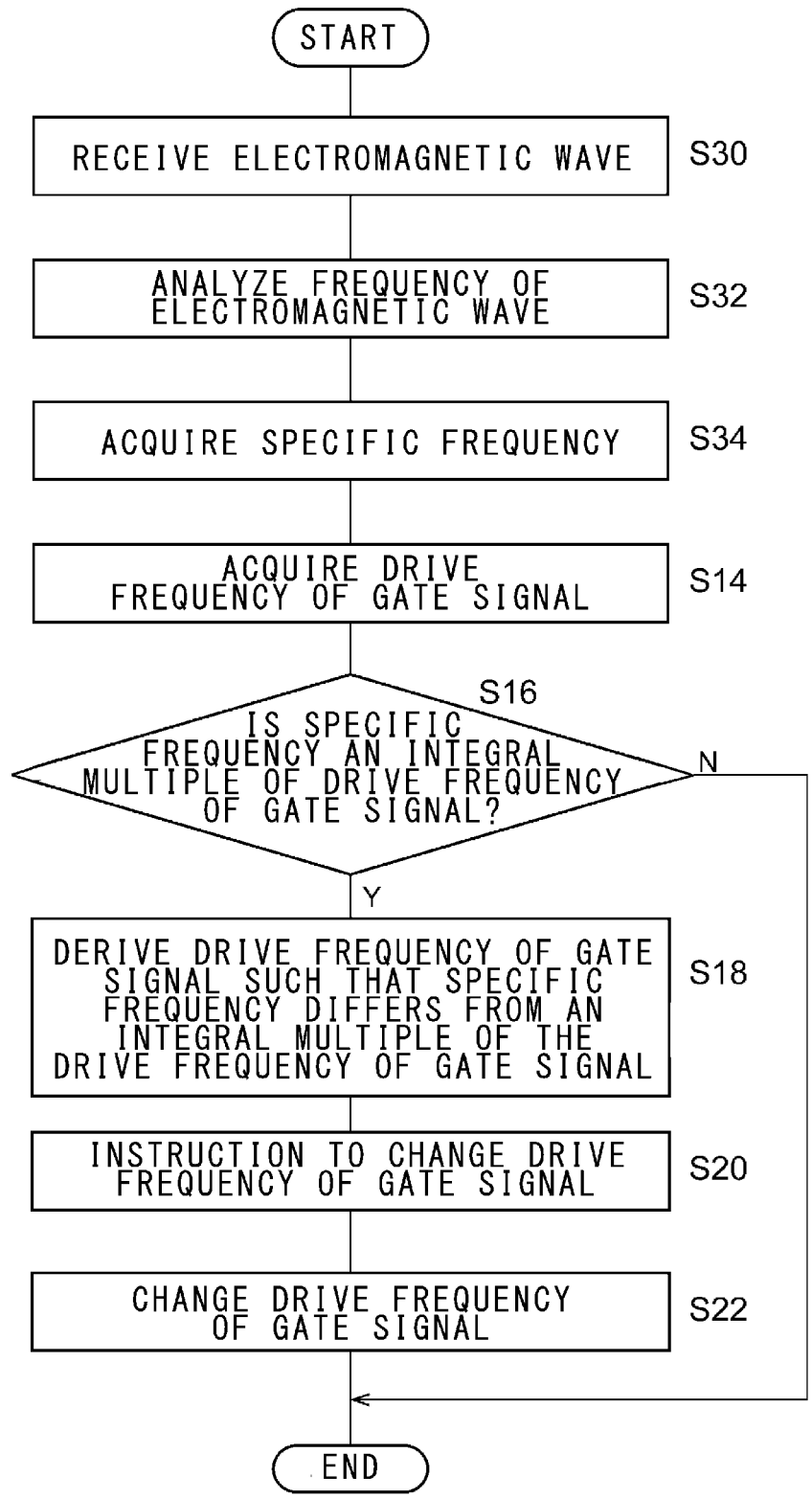
FIG. 11 is a flowchart that shows processing performed in the display system according to the third embodiment.

FIG. 11 is a flowchart that shows processing performed in the display system 1 according to the third embodiment. The processing shown in FIG. 11 is regularly performed. The antenna 100 receives an electromagnetic wave (S30). The frequency analyzer 98 analyzes the frequency of the electromagnetic wave received at the antenna 100 (S32). The first acquirer 92 acquires the specific frequency from the frequency analyzer 98 (S34). The subsequent processes from S14 to S22 are identical with those in the first embodiment.

Only the radiation of an electromagnetic wave from an external device may not affect the reception at the receiver 14, and also only the radiation of the fundamental wave component and harmonic components of the gate signal GS may not affect the reception at the receiver 14. However, if the radiation of an electromagnetic wave from an external device and the radiation of the fundamental wave component and the like of the gate signal GS occurs simultaneously, the receiver 14 may be affected thereby. More specifically, when the frequency of an electromagnetic wave radiated from an external device is an integral multiple of the drive frequency of the gate signal GS and when the electromagnetic wave and the gate signal GS are identical in phase, the amplitude of the combined wave of the electromagnetic wave and the gate signal GS becomes larger than the amplitude of each of the electromagnetic wave and the gate signal GS. When such a combined wave having larger amplitude is input to the receiver 14, the reception performance of the receiver 14 may be degraded regardless of the frequency of the combined wave.

Meanwhile, according to the present embodiment, when the specific frequency is an integral multiple of the drive frequency of the gate signal GS, the drive frequency of the gate signal GS is changed. This restrains the gate signal GS from increasing the amplitude of an electromagnetic wave radiated from an external device to the receiver 14. Therefore, the reception at the receiver 14 can be made less affected.

The antenna 100 need not necessarily be provided, and the frequency analyzer 98 may analyze the frequency of an electromagnetic wave received at the antenna 16 when the receiver 14 does not operate. Also, the antenna 100 may be the common electrodes 34 of the display device 22. In these cases, since the antenna 100 need not be added, increase in size and cost can be prevented.

Fourth Embodiment

In the fourth embodiment, the configuration of the first embodiment is provided, and, in addition, when an activation request for a function of the host is made, the frequency of an electromagnetic wave radiated upon the activation of the function is acquired as the specific frequency. In the following, description will be given mainly for the differences from the first embodiment.

Figure 12:
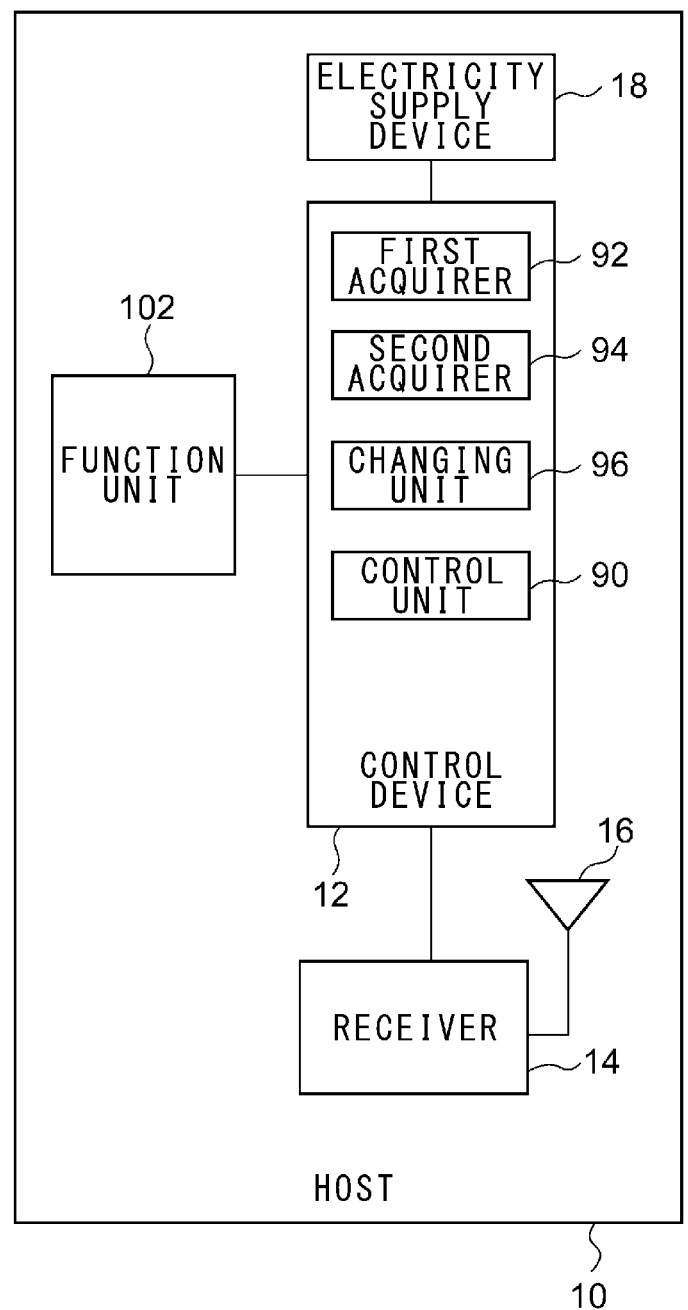
FIG. 12 is a block diagram of a host according to a fourth embodiment.

FIG. 12 is a block diagram of the host 10 according to the fourth embodiment. The host 10 further includes a function unit 102. The function unit 102 may be a function circuit. The function unit 102 performs a predetermined function and, while performing the function, radiates an electromagnetic wave. The function unit 102 may include a contactless battery charger, for example.

The control unit 90 controls the function unit 102 and outputs, to the first acquirer 92, the frequency of an electromagnetic wave radiated by the function unit 102. For example, when a user has made an activation request for the function unit 102, the control unit 90 outputs the frequency of an electromagnetic wave radiated by the function unit 102 before activating the function unit 102.

The first acquirer 92 acquires, as the specific frequency, the frequency of the electromagnetic wave output from the control unit 90.

Figure 13:
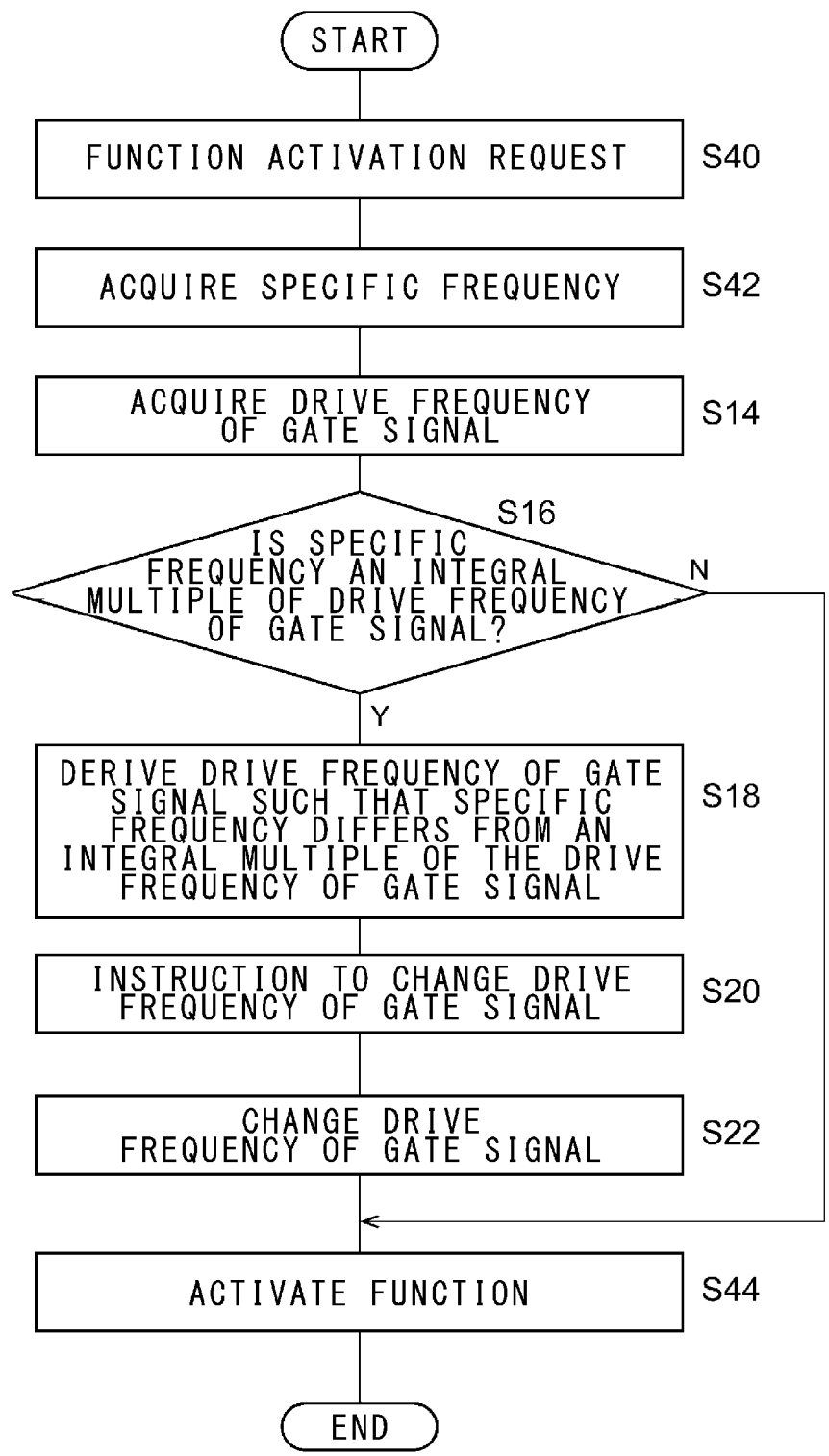
FIG. 13 is a flowchart that shows processing performed in the display system according to the fourth embodiment.

FIG. 13 is a flowchart that shows processing performed in the display system 1 according to the fourth embodiment.

The processing shown in FIG. 12 is performed each time the function activation request is made. The control unit 90 receives the function activation request (S40), and the first acquirer 92 acquires the specific frequency from the control unit 90 (S42). The subsequent processes from S14 to S22 are identical with those in the first embodiment. After S22, the control unit 90 activates the function in response to the activation request (S44), and the processing is terminated. Also when the specific frequency is not an integral multiple of the drive frequency of the gate signal GS (N at S16), the process of S44 is performed.

As is the case in the third embodiment, even when only the radiation of an electromagnetic wave from the function unit 102 does not affect the reception at the receiver 14 and also only the radiation of the fundamental wave component and harmonic components of the gate signal GS does not affect the reception at the receiver 14, if the radiation of an electromagnetic wave from the function unit 102 and the radiation of the fundamental wave component and the like of the gate signal GS occurs simultaneously, the receiver 14 may be affected thereby.

Meanwhile, according to the present embodiment, when the specific frequency is an integral multiple of the drive frequency of the gate signal GS, the drive frequency of the gate signal GS is changed. This restrains the gate signal GS from increasing the amplitude of an electromagnetic wave radiated from the function unit 102 to the receiver 14. Therefore, the reception at the receiver 14 can be made less affected.

Also, when the specific frequency is an integral multiple of the drive frequency of the gate signal GS, the drive frequency of the gate signal GS is changed before the function for which the activation request has been made is activated. Accordingly, the reception at the receiver 14 at the time of activation of the function can be made less affected.

In the first through fourth embodiments, the control device 12 of the host 10 judges whether or not the specific frequency is an integral multiple of the drive frequency of the gate signal GS before changing the drive frequency of the gate signal GS. However, the process may be performed by the control device 24 of the display module 20, instead of the control device 12. In this case, the control unit 70 of the control device 24 includes the first acquirer 92, the second acquirer 94, and the changing unit 96 shown in FIG. 1. This modification allows greater flexibility in the configuration of the display system 1.

The third or fourth embodiment may be combined with the second embodiment. Also, the third embodiment may be combined with the fourth embodiment. Also, the second through fourth embodiments may be combined. An additional embodiment made by such a combination has the effect of each of the combined embodiments.

In each of the aforementioned embodiments, the control of changing the drive frequency of the gate signal GS may be performed on at least one of control signals used to control the display device 22 as exemplified below. This can restrain the interference of harmonics of the control signal with a signal having the specific frequency. In this case, the second acquirer 94 acquires the frequency of the control signal used to control the display device 22.

For example, when the specific frequency is an integral multiple of the frequency of the source signal SS, the changing unit 96 may change the frequency of the source signal SS. The source signal SS is a control signal used to control the display device 22.

Also, when the specific frequency is an integral multiple of the frequency of the touch drive signal TX, for example, the changing unit 96 may change the frequency of the touch drive signal TX. The touch drive signal TX is a control signal used to control the display device 22.

Also, when the specific frequency is an integral multiple of the frequency of each source oscillation (source oscillation of a control signal related to image display, the touch drive signal TX, a central processing unit (CPU), or the like), for example, the changing unit 96 may change the frequency of the source oscillation. Each source oscillation is a control signal used to control the display device 22.

Also, when the specific frequency to be avoided is an integral multiple of the frequency of the clock signal of Low voltage differential signal (LVDS), the frequency of the clock signal of Mobile Industry Processor Interface (MIPI), the frequency of the clock signal of Serial Peripheral Interface (SPI), the frequency of the clock signal of Inter-Integrated Circuit (I2C), or the frequency of a pulse width modulation (PWM) signal used for control of the backlight unit 40, for example, the changing unit 96 may change the frequency of the signal. Each of LVDS, MIPI, SPI, and I2C is an interface used for signal transmission between the host 10 and the control device 24. Each of the clock signals of LVDS, MIPI, SPI, and I2C is a control signal used to control the display device 22. The PWM signal used for control of the backlight unit 40 is a control signal used to control the display device 22.

Fifth Embodiment

In the fifth embodiment, a gate signal GS as a sine wave is used, and whether or not the specific frequency is an integral multiple of the drive frequency of the gate signal GS is not judged. In the following, description will be given mainly for the differences from the first embodiment.

Figure 14:
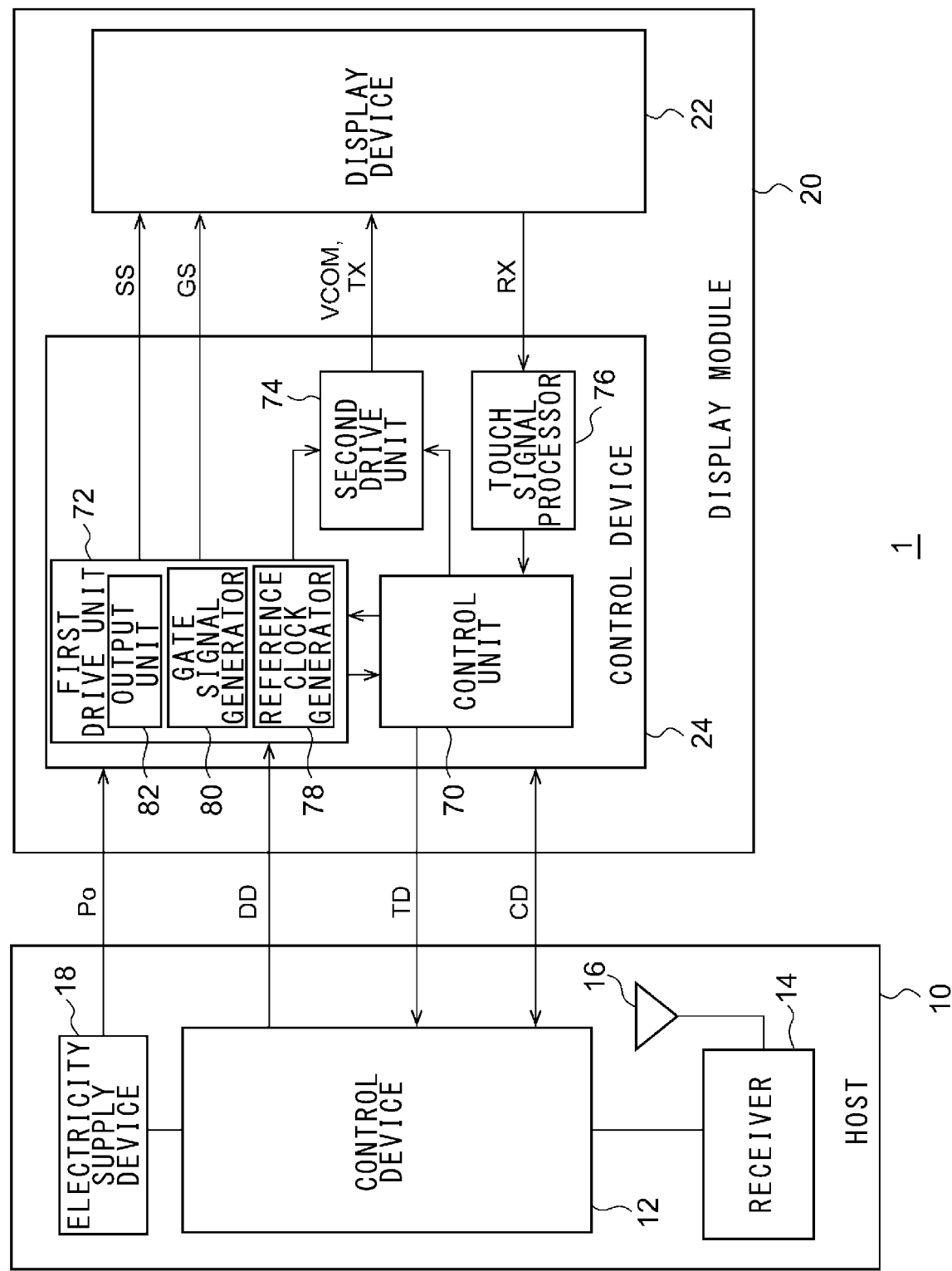
FIG. 14 is a block diagram of a display system according to a fifth embodiment.

FIG. 14 is a block diagram of the display system 1 according to the fifth embodiment. The control device 12 does not include the control unit 90, the first acquirer 92, the second acquirer 94, and the changing unit 96 provided in the first embodiment. The control device 12 controls the receiver 14 and the electricity supply device 18. Also, the control device 12 supplies the image data DD and the control data CD to the display module 20 and controls the display module 20 based on such data.

As described previously, the display device 22 is more likely to emit noise caused in the TFT substrate 44 toward the front side, compared to the configuration in which electrodes are arranged on the front side of the common electrodes 34.

In the control device 24, the first drive unit 72 includes the reference clock generator 78, a gate signal generator 80, and an output unit 82. The reference clock generator 78 has the functions as described in the first embodiment. The first drive unit 72 generates the source signal SS in the same way as in the first embodiment but does not generate the gate signal GS. The gate signal generator 80 generates a gate signal GS as a sine wave in synchronization with the generated reference clock signal under the control of the control unit 70. The gate signal generator 80 generates the gate signal GS having the same frequency as the reference clock signal. The gate signal generator 80 generates the gate signal GS as a sine wave having amplitude that is set in advance such that the ON time of pixel switching elements 30 becomes closer to a designed value.

The output unit 82 outputs the source signal SS serially to the multiple source lines in the display device 22 and also outputs the gate signal GS serially to the multiple gate lines in the display device 22.

Figure 15:
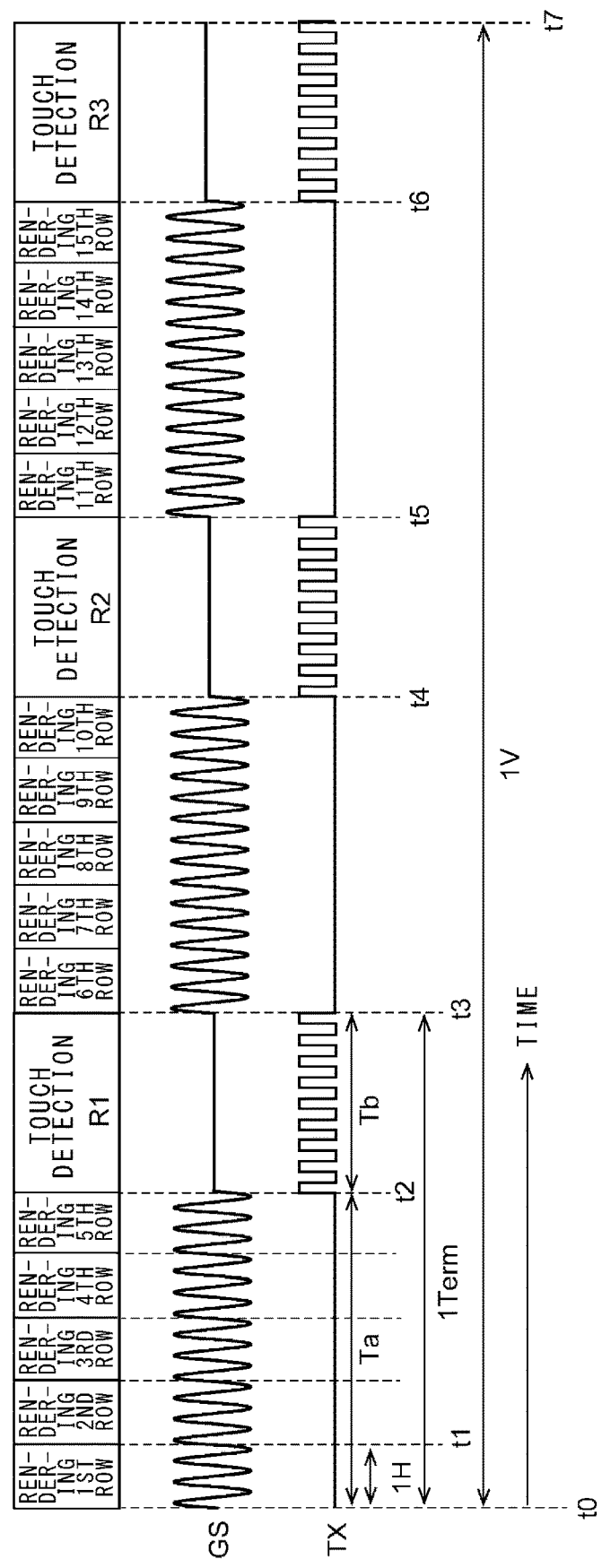
FIG. 15 is a diagram that shows timings of a gate signal and a touch drive signal in one frame in the fifth embodiment corresponding to FIGS. 5A-5F.

FIG. 15 shows timings of a gate signal GS and a touch drive signal TX in one frame in the fifth embodiment corresponding to FIGS. 5A-5F.

First, as shown in FIG. 5A, the five rows from the top of one frame are rendered. At the time, within the horizontal scanning period (1H) from the time t0 to the time t1, the gate signal GS includes three cycles of the waveform supplied to the gate line G1 corresponding to the first row, as shown in FIG. 15. The three cycles of the waveform are provided for red pixels, green pixels, and blue pixels in sequence, for example. After the time t1, the gate signal GS is serially supplied to the gate lines corresponding to the second row, third row, fourth row, and fifth row in the same way, and the supply of the gate signal GS is stopped at the time t2. During the display period Ta from t0 to t2, the reference voltage VCOM, not illustrated, is supplied to the multiple common electrodes 34 while the touch drive signal TX is not supplied. The subsequent operation after the time t2 is the same as that shown in FIG. 6 described previously.

Figure 16:
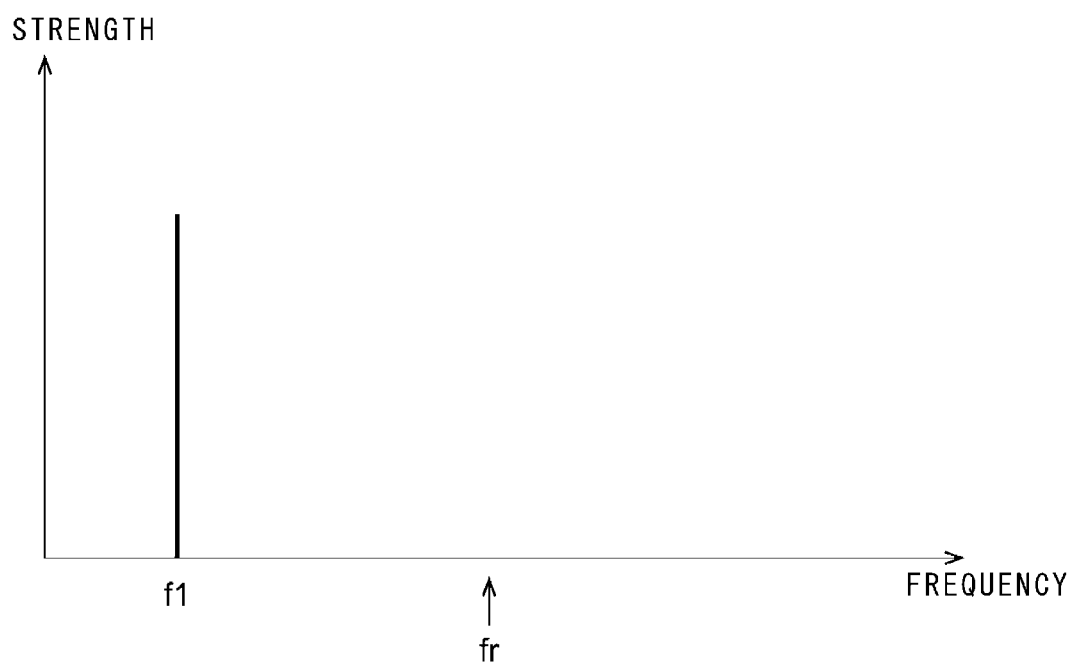
FIG. 16 is a diagram that schematically shows frequency components of a gate signal as a sine wave in the display system shown in FIG. 14.

FIG. 16 schematically shows frequency components of a gate signal GS as a sine wave in the display system 1 shown in FIG. 14. The gate signal GS contains the fundamental wave component at the drive frequency f1 of the gate signal GS but does not substantially contain harmonic components. The radio reception frequency fr is higher than the drive frequency f1 of the gate signal GS. A harmonic component of the gate signal GS at a frequency that overlaps the radio reception frequency fr is not substantially radiated from the front side of the display device 22. Therefore, radio reception at the receiver 14 is less likely to be affected.

The example of FIG. 16 shows a gate signal GS as a sine wave that does not substantially contain harmonic components. However, the sine wave in the present specification includes a waveform containing a harmonic component of a magnitude that is less likely to affect the reception at the receiver 14.

According to the present embodiment, using a gate signal GS as a sine wave, the magnitude of harmonics of the gate signal GS can be reduced, compared to the case of a square wave. Accordingly, the interference of harmonics of the gate signal GS with a signal received at the receiver 14 can be restrained, without adding an electrode for shielding in the display device 22. Therefore, the reception at the receiver 14 can be made less affected, without degrading the accuracy and sensitivity of touch position detection.

Sixth Embodiment

The sixth embodiment differs from the fifth embodiment in that a gate signal GS as a square wave and a gate signal GS as a sine wave are switched therebetween. In the following, description will be given mainly for the differences from the fifth embodiment.

Figure 17:
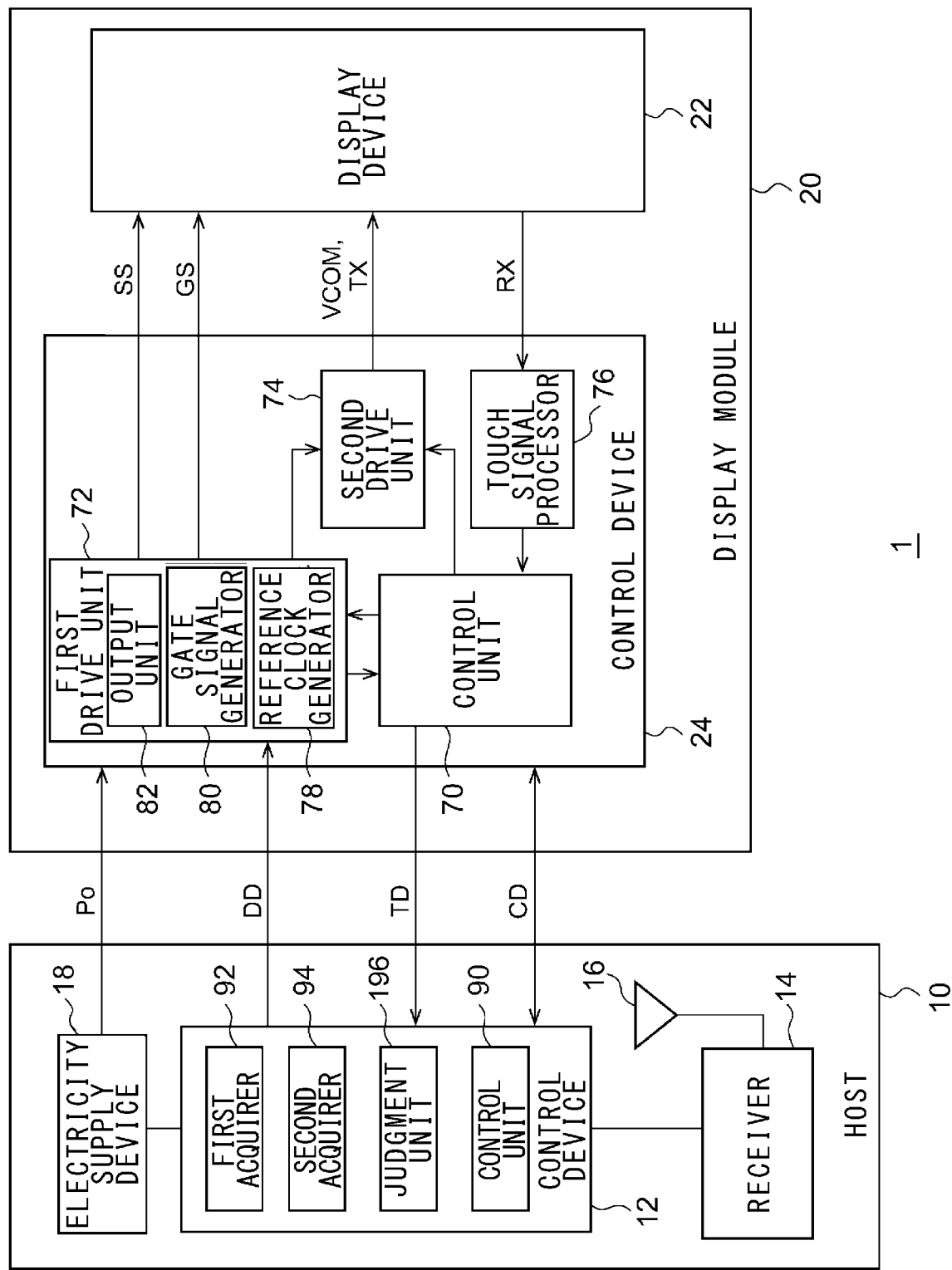
FIG. 17 is a block diagram of a display system according to a sixth embodiment.

FIG. 17 is a block diagram of the display system 1 according to the sixth embodiment. The control device 12 of the host 10 includes the control unit 90, the first acquirer 92, the second acquirer 94, and a judgment unit 196.

Each of the control unit 90 and the second acquirer 94 has the functions as described in the first embodiment. The first acquirer 92 acquires the frequency of a wireless signal output from the control unit 90, as a specific frequency at which harmonics need to be restrained. The specific frequency is higher than the drive frequency of the gate signal GS and may be a frequency in a range from a hundred kHz to several GHz, for example.

The judgment unit 196 judges whether or not the specific frequency and the drive frequency of the gate signal GS thus acquired satisfy a changing condition and outputs the judgment result to the control unit 70 of the control device 24. More specifically, when the specific frequency is an integral multiple of the drive frequency of the gate signal GS, the judgment unit 196 judges that the specific frequency and the drive frequency of the gate signal GS satisfy the changing condition; when the specific frequency is not an integral multiple of the drive frequency of the gate signal GS, the judgment unit 196 judges that the specific frequency and the drive frequency of the gate signal GS do not satisfy the changing condition.

The control unit 70 of the control device 24 allows the gate signal generator 80 to generate a gate signal GS based on the judgment result output from the judgment unit 196.

When the specific frequency and the drive frequency of the gate signal GS satisfy the changing condition, the gate signal generator 80 generates a gate signal GS as a sine wave; when the specific frequency and the drive frequency of the gate signal GS do not satisfy the changing condition, the gate signal generator 80 generates a gate signal GS as a square wave. The gate signal GS as a sine wave may be generated as described in a first example, a second example, or a third example below. Hereinafter, the gate signal GS as a square wave may also be referred to as a gate signal GSa, and the gate signal GS as a sine wave may also be referred to as a gate signal GSb.

Figure 18:
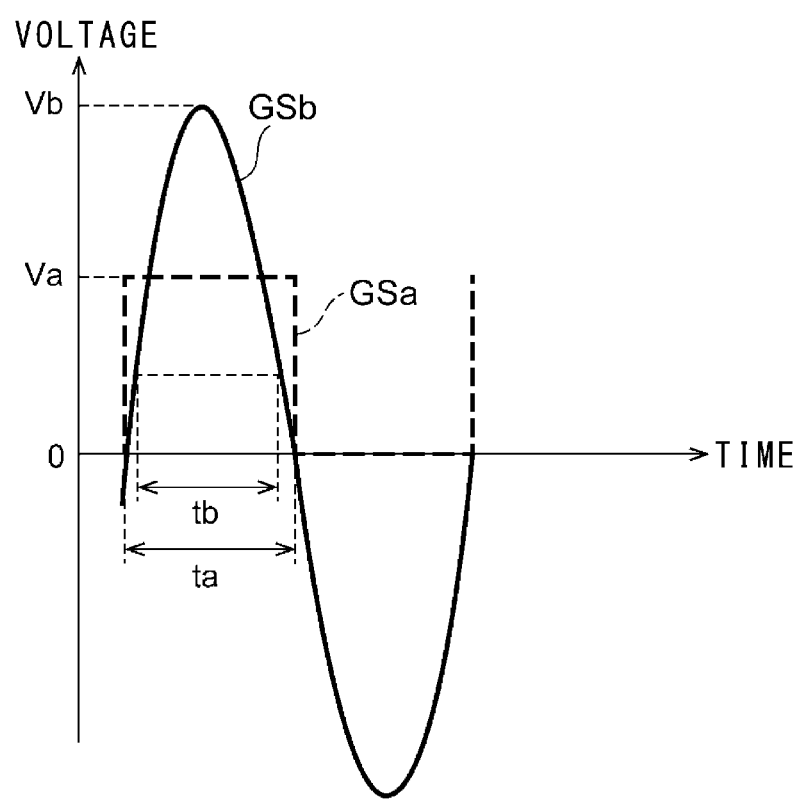
FIG. 18 is a diagram that shows a first example of waveforms of a gate signal as a square wave and a gate signal as a sine wave in the display system shown in FIG. 17.

FIG. 18 shows the first example of waveforms of a gate signal GSa as a square wave and a gate signal GSb as a sine wave in the display system 1 shown in FIG. 17. The gate signal generator 80 generates the gate signal GSb as a sine wave having amplitude Vb that is larger than amplitude Va of the gate signal GSa as a square wave. The frequency of the gate signal GSb as a sine wave is substantially identical with the frequency of the gate signal GSa as a square wave.

In this case, ON time tb of pixel switching elements 30 driven by the gate signal GSb as a sine wave can be made closer to ON time to of pixel switching elements 30 driven by the gate signal GSa as a square wave. This can restrain change in the image quality due to change of the ON time.

Figure 19:
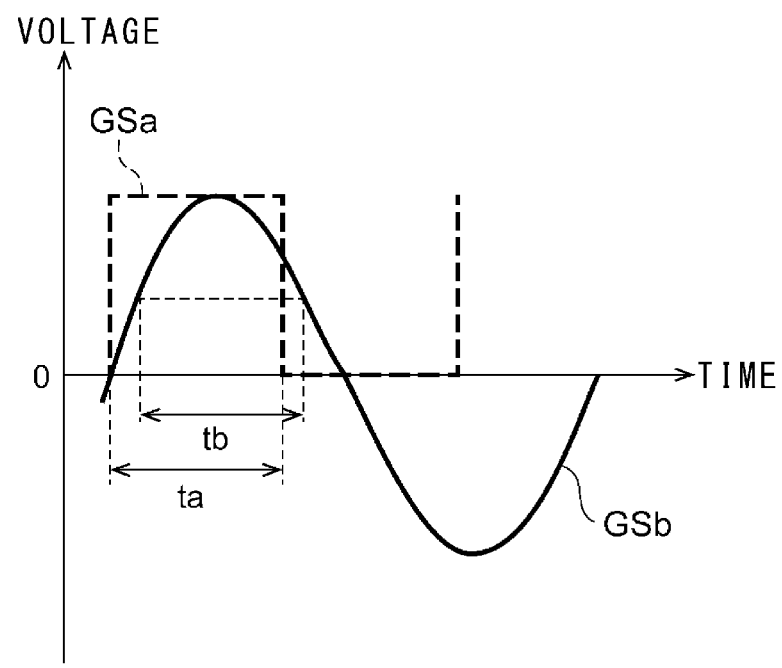
FIG. 19 is a diagram that shows a second example of waveforms of a gate signal as a square wave and a gate signal as a sine wave in the display system shown in FIG. 17.

FIG. 19 shows the second example of waveforms of the gate signal GSa as a square wave and the gate signal GSb as a sine wave in the display system 1 shown in FIG. 17. In the second example, the gate signal generator 80 generates the gate signal GSb as a sine wave having a frequency that is lower than the frequency of the gate signal GSa as a square wave. The amplitude of the gate signal GSb as a sine wave is substantially identical with the amplitude of the gate signal GSa as a square wave.

The ON time tb of the pixel switching elements 30 driven by the gate signal GSb as a sine wave is substantially identical with the ON time ta of the pixel switching elements 30 driven by the gate signal GSa as a square wave. This can further restrain change in the image quality due to change of the ON time. Since the amplitude of the gate signal GSb as a sine wave can be made smaller than that in the first example, power consumption can also be reduced, compared to the first example.

Figure 20:
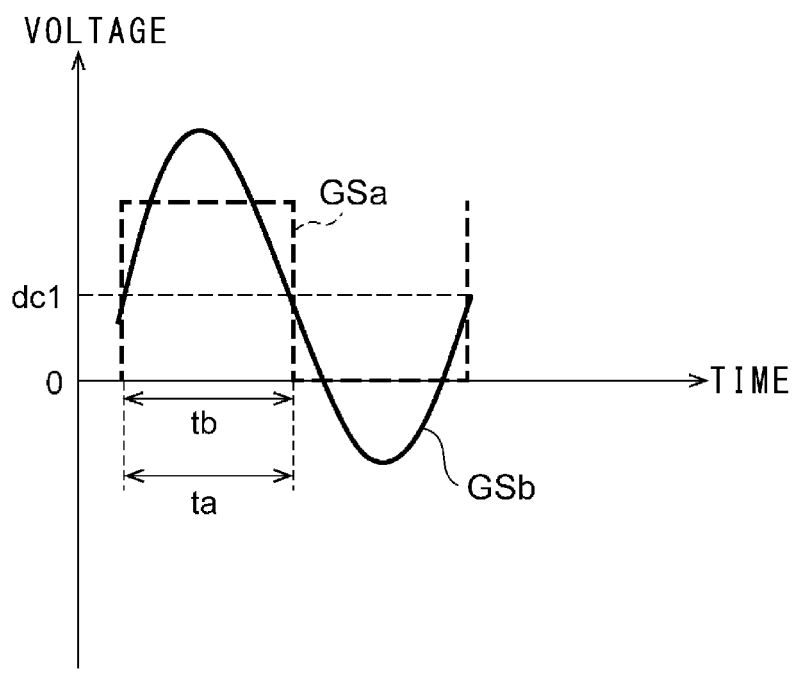
FIG. 20 is a diagram that shows a third example of waveforms of a gate signal as a square wave and a gate signal as a sine wave in the display system shown in FIG. 17.

FIG. 20 shows the third example of waveforms of the gate signal GSa as a square wave and the gate signal GSb as a sine wave in the display system 1 shown in FIG. 17. The gate signal generator 80 generates the gate signal GSb as a sine wave that contains a positive direct-current component dc1. The amplitude and frequency of the gate signal GSb as a sine wave is substantially identical with the amplitude and frequency of the gate signal GSa as a square wave.

The ON time tb of the pixel switching elements 30 driven by the gate signal GSb as a sine wave is substantially identical with the ON time ta of the pixel switching elements 30 driven by the gate signal GSa as a square wave. This can further restrain change in the image quality due to change of the ON time. Since the amplitude of the gate signal GSb as a sine wave can be made smaller than that in the first example, power consumption can also be reduced, compared to the first example. Also, since the frequency of the gate signal GS is constant, designing is easier and the configuration of the display system 1 can be simplified, compared to the second example.

At least two of the first through third examples may be combined, and the On time in the case of the square wave may be made equal to that in the case of the sine wave.

Also, as with the case in the fifth embodiment, the gate signal GS as a sine wave may contain a harmonic component. The gate signal generator 80 generates a gate signal GS as a sine wave such that a harmonic component of the gate signal GS as a sine wave becomes lower by 10 dB or more than the maximum value of a harmonic component of the gate signal GS as a square wave. A harmonic component in the gate signal GS as a sine wave that satisfies this condition is less likely to affect the reception at the receiver 14. Since the sine wave may contain a harmonic component, greater flexibility in the design of the gate signal generator 80 can be allowed.

Figure 21:
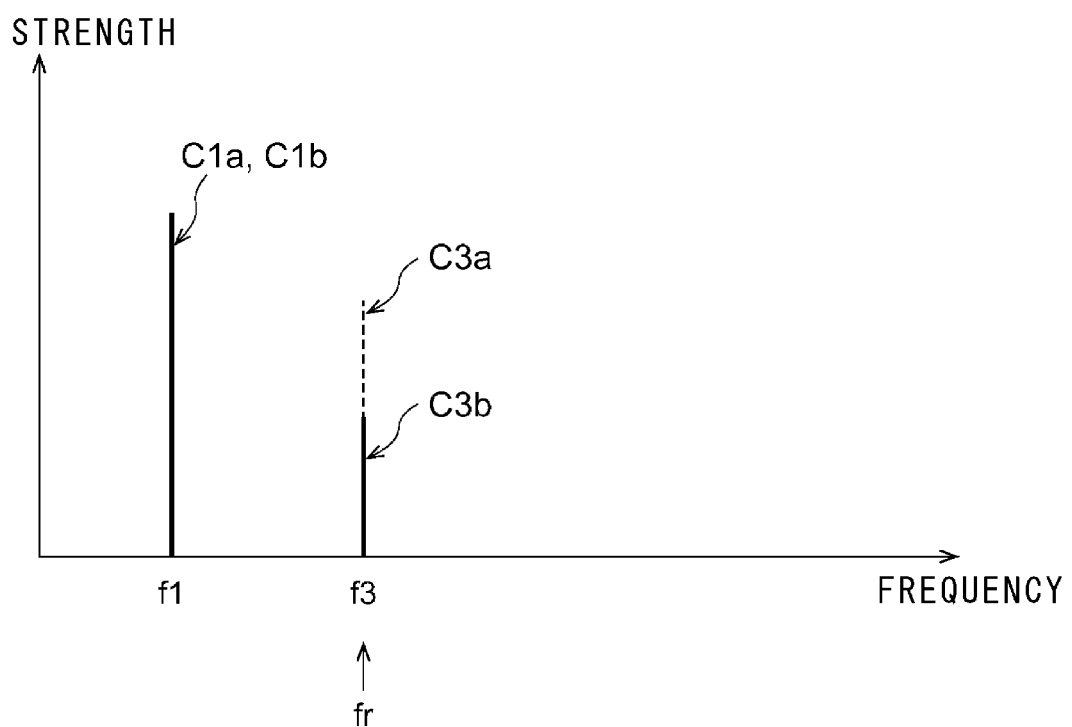
FIG. 21 is a diagram that schematically shows frequency components of a gate signal as a square wave and a gate signal as a sine wave in the display system shown in FIG. 17.

FIG. 21 schematically shows frequency components of a gate signal GS as a square wave and a gate signal GS as a sine wave in the display system 1 shown in FIG. 17. The gate signal GS as a sine wave in FIG. 21 is different from the gate signal GS as a sine wave in each of FIGS. 18 through 20. The gate signal GS as a square wave contains a fundamental wave component C1a at the drive frequency f1 of the gate signal GS and a third-order harmonic component C3a at the frequency f3. The gate signal GS may contain other harmonic components, though illustration thereof is omitted. It is assumed here, for example, that the frequency f3 is identical with the radio reception frequency fr.

The gate signal GS as a sine wave contains a fundamental wave component C1b at the drive frequency f1 of the gate signal GS and a third-order harmonic component C3b at the frequency f3. The third-order harmonic component C3b is lower by 10 dB or more than the third-order harmonic component C3a of the gate signal GS as a square wave. Accordingly, the amount of radiation, from the front side of the display device 22, of the third-order harmonic component C3b of the gate signal GS as a sine wave becomes smaller, compared to the case of the gate signal GS as a square wave. Therefore, interference with a radio wave received at the receiver 14 is less likely to occur.

Figure 22:
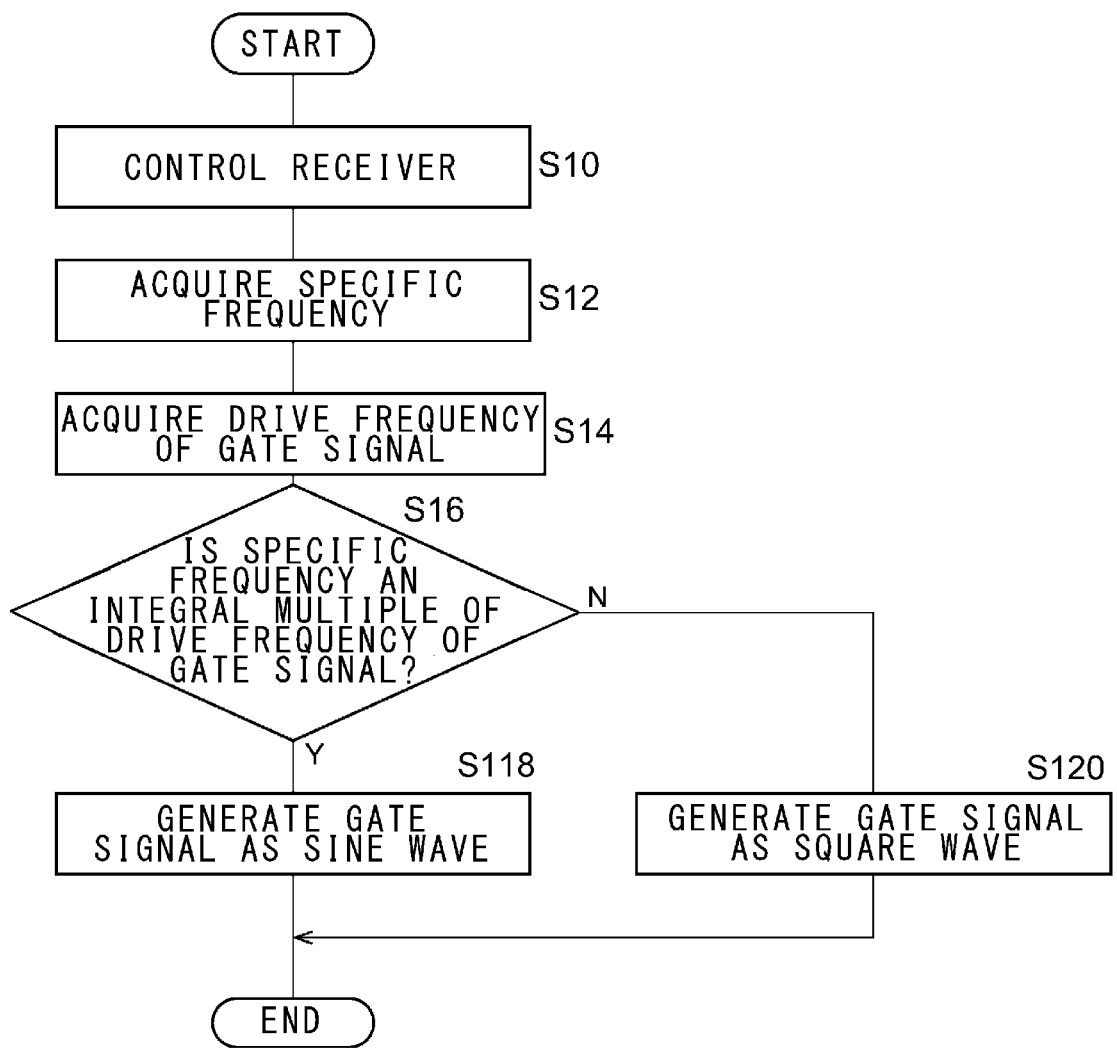
FIG. 22 is a flowchart that shows processing performed in the display system shown in FIG. 17.

There will now be described the overall operation of the display system 1 having the configuration set forth above. FIG. 22 is a flowchart that shows processing performed in the display system 1 shown in FIG. 17. The processing shown in FIG. 22 is performed each time the control unit 90 of the control device 12 controls the receiver 14.

The processes of S10, S12, S14, and S16 are identical with those in the first embodiment. When the specific frequency is an integral multiple of the drive frequency of the gate signal GS (Y at S16), the gate signal generator 80 generates a gate signal GS as a sine wave (S118), and the processing is terminated. When the specific frequency is not an integral multiple of the drive frequency of the gate signal GS (N at S16), the gate signal generator 80 generates a gate signal GS as a square wave (S120), and the processing is terminated.

According to the present embodiment, since the gate signal GS as a sine wave is generated only when the specific frequency is an integral multiple of the drive frequency of the gate signal GS, power consumption can be reduced, compared to the fifth embodiment. In addition, the effects of the fifth embodiment can also be obtained.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

For example, in the fifth embodiment, the gate signal generator 80 may generate a gate signal GS as a sine wave having a frequency that is lower than the frequency of the reference clock signal. The frequency and amplitude of the gate signal GS as a sine wave is determined in advance such that the ON time of the pixel switching elements 30 becomes closer to a designed value. In this modification, the ON time can be made closer to the designed value while increase of the amplitude of the gate signal GS is restrained. Therefore, the power consumption can be reduced, compared to the fifth embodiment.

In the fifth embodiment, the gate signal generator 80 may generate a gate signal GS as a sine wave that contains a positive direct-current component. The value of the direct-current component and the amplitude of the gate signal GS is determined in advance such that the ON time of the pixel switching elements 30 becomes closer to a designed value. In this modification, the ON time can be made closer to the designed value while increase of the amplitude of the gate signal GS is restrained. Therefore, the power consumption can be reduced, compared to the fifth embodiment.

In the sixth embodiment, the control device 12 of the host 10 judges whether or not the specific frequency is an integral multiple of the drive frequency of the gate signal GS before changing the drive frequency of the gate signal GS. However, the process may be performed by the control device 24 of the display module 20, instead of the control device 12. In this case, the control unit 70 of the control device 24 includes the first acquirer 92, the second acquirer 94, and the judgment unit 196 shown in FIG. 17. This modification allows greater flexibility in the configuration of the display system 1.

A control device according to one aspect of the present disclosure controls a display device including multiple gate lines and multiple common electrodes used for both image display and touch detection, and the control device includes:

a first acquirer that acquires a specific frequency to be avoided;

a second acquirer that acquires a drive frequency of a gate signal supplied to the multiple gate lines; and a changing unit that changes the drive frequency when the specific frequency and the drive frequency thus acquired satisfy a changing condition.

According to this aspect, when the specific frequency and the drive frequency of the gate signal satisfy the changing condition, the drive frequency of the gate signal is changed. This restrains the interference of the gate signal with a signal having the specific frequency, without adding an electrode for shielding in the display device. Therefore, the reception at the receiver can be made less affected, without degrading the accuracy and sensitivity of touch position detection.

In the control device according to the one aspect of the present disclosure, for example, the changing unit may change the drive frequency when the specific frequency is an integral multiple of the drive frequency.

This case can restrain the interference of the gate signal with a signal having the specific frequency.

In the control device according to the one aspect of the present disclosure, for example, the changing unit may change the drive frequency while a period of one frame, within which the gate signal for one screen of a display image is supplied to the multiple gate lines, is kept unchanged.

In this case, since the period of one frame is kept unchanged, the frame rate of the display image can be kept constant.

In the control device according to the one aspect of the present disclosure, for example, the period of one frame may be divided into multiple sub-frame periods, each sub-frame period may include a display period for which the gate signal is supplied to the multiple gate lines, and a touch detection period for which a touch drive signal is supplied to the multiple common electrodes, and the changing unit may change the proportions of the display period and the touch detection period while keeping the sub-frame period unchanged, and change the drive frequency.

In this case, since each sub-frame period is kept unchanged, touch detection can be performed with a constant period, and the frame rate of the display image can be kept constant.

The control device according to the one aspect of the present disclosure may further include a control unit that controls a receiver for receiving a wireless signal and outputs a frequency of the wireless signal to the first acquirer, for example, and the first acquirer may acquire, as the specific frequency, the frequency of the wireless signal output from the control unit.

In this case, interference of harmonics of the gate signal with a wireless signal having the specific frequency is less likely to occur. Therefore, the reception of a wireless signal at the receiver can be made less affected.

The control device according to the one aspect of the present disclosure may further include a frequency analyzer that analyzes a frequency of an electromagnetic wave received at an antenna, for example, and the first acquirer may acquire, as the specific frequency, the frequency of the electromagnetic wave analyzed by the frequency analyzer.

This case can restrain the gate signal from increasing the amplitude of an electromagnetic wave radiated from an external device to the receiver. Therefore, the reception at the receiver can be made less affected.

The control device according to the one aspect of the present disclosure may further include a control unit that controls a function unit that performs a predetermined function and radiates an electromagnetic wave, and the control unit outputs a frequency of the electromagnetic wave to the first acquirer, for example, and the first acquirer may acquire, as the specific frequency, the frequency of the electromagnetic wave output from the control unit.

This case can restrain the gate signal from increasing the amplitude of an electromagnetic wave radiated from the function unit to the receiver. Therefore, the reception at the receiver can be made less affected.

A control method according to one aspect of the present disclosure is used for a display device including multiple gate lines and multiple common electrodes used for both image display and touch detection, and the control method includes:

first acquiring of acquiring a specific frequency to be avoided;

second acquiring of acquiring a drive frequency of a gate signal supplied to the multiple gate lines; and changing the drive frequency when the specific frequency and the drive frequency thus acquired satisfy a changing condition.

According to this aspect, when the specific frequency and the drive frequency of the gate signal satisfy the changing condition, the drive frequency of the gate signal is changed. This restrains the interference of the gate signal with a signal having the specific frequency, without adding an electrode for shielding in the display device. Therefore, the reception at the receiver can be made less affected, without degrading the accuracy and sensitivity of touch position detection.

A display system according to one aspect of the present disclosure includes:

a display device that includes multiple gate lines and multiple common electrodes used for both image display and touch detection; and a control device that controls the display device, and the control device includes:

a first acquirer that acquires a specific frequency to be avoided;

a second acquirer that acquires a drive frequency of a gate signal supplied to the multiple gate lines; and a changing unit that changes the drive frequency when the specific frequency and the drive frequency thus acquired satisfy a changing condition.

According to this aspect, when the specific frequency and the drive frequency of the gate signal satisfy the changing condition, the drive frequency of the gate signal is changed. This restrains the interference of the gate signal with a signal having the specific frequency, without adding an electrode for shielding in the display device. Therefore, the reception at the receiver can be made less affected, without degrading the accuracy and sensitivity of touch position detection.

A control device according to one aspect of the present disclosure controls a display device including multiple gate lines, multiple source lines, and multiple common electrodes used for both image display and touch detection, and the control device includes:

a first acquirer that acquires a specific frequency to be avoided;

a second acquirer that acquires a frequency of a control signal used to control the display device; and a changing unit that changes the frequency of the control signal when the specific frequency is an integral multiple of the frequency of the control signal.

According to this aspect, the reception at the receiver can be made less affected, without degrading the accuracy and sensitivity of touch position detection.

A control method according to one aspect of the present disclosure is used for a display device including multiple gate lines, multiple source lines, and multiple common electrodes used for both image display and touch detection, and the control method includes:

first acquiring of acquiring a specific frequency to be avoided;

second acquiring of acquiring a frequency of a control signal used to control the display device; and changing the frequency of the control signal when the specific frequency is an integral multiple of the frequency of the control signal.

According to this aspect, the reception at the receiver can be made less affected, without degrading the accuracy and sensitivity of touch position detection.

A display system according to one aspect of the present disclosure includes:

a display device including multiple gate lines, multiple source lines, and multiple common electrodes used for both image display and touch detection; and a control device that controls the display device, and the control device includes:

a first acquirer that acquires a specific frequency to be avoided;

a second acquirer that acquires a frequency of a control signal used to control the display device; and a changing unit that changes the frequency of the control signal when the specific frequency is an integral multiple of the frequency of the control signal.

According to this aspect, the reception at the receiver can be made less affected, without degrading the accuracy and sensitivity of touch position detection.

A control device according to one aspect of the present disclosure controls a display device including multiple gate lines and multiple common electrodes used for both image display and touch detection, and the control device includes:

a gate signal generator that generates a gate signal as a sine wave; and an output unit that outputs the gate signal generated by the gate signal generator to the multiple gate lines.

According to this aspect, using a gate signal as a sine wave, the magnitude of harmonics of the gate signal can be reduced, compared to the case of a square wave. Accordingly, the interference of harmonics of the gate signal with a signal received at the receiver can be restrained, without adding an electrode for shielding in the display device. Therefore, the reception at the receiver can be made less affected, without degrading the accuracy and sensitivity of touch position detection.

In the control device according to the one aspect of the present disclosure, for example, when a specific frequency at which harmonics need to be restrained and a drive frequency of the gate signal satisfy a changing condition, the gate signal generator may generate the gate signal as a sine wave, and, when the specific frequency and the drive frequency do not satisfy the changing condition, the gate signal generator may generate the gate signal as a square wave.

In this case, since the gate signal as a sine wave is generated only when the specific frequency is an integral multiple of the drive frequency of the gate signal, power consumption can be reduced, compared to the case where the gate signal as a sine wave is always generated regardless of the relationship between the specific frequency and the drive frequency of the gate signal.

In the control device according to the one aspect of the present disclosure, for example, the gate signal generator may generate the gate signal as a sine wave having amplitude that is larger than amplitude of the gate signal as a square wave.

In this case, the ON time of pixel switching elements in the case of a sine wave can be made closer to the ON time in the case of a square wave.

In the control device according to the one aspect of the present disclosure, for example, the gate signal generator may generate the gate signal as a sine wave having a frequency that is lower than a frequency of the gate signal as a square wave.

In this case, the ON time of the pixel switching elements in the case of a sine wave can be made substantially identical with the ON time in the case of a square wave while increase of the amplitude of the gate signal as a sine wave is restrained.

In the control device according to the one aspect of the present disclosure, for example, the gate signal generator may generate the gate signal as a sine wave that contains a direct-current component.

In this case, the ON time of the pixel switching elements in the case of a sine wave can be made substantially identical with the ON time in the case of a square wave while increase of the amplitude of the gate signal as a sine wave is restrained.

In the control device according to the one aspect of the present disclosure, for example, each of the multiple gate lines may be connected to multiple pixel switching elements, and ON time of the multiple pixel switching elements driven by the gate signal as a sine wave may be identical with ON time of the multiple pixel switching elements driven by the gate signal as a square wave.

This case can restrain change in the image quality due to change of the ON time of the pixel switching elements between the case of the gate signal as a sine wave and the case of the gate signal as a square wave.

In the control device according to the one aspect of the present disclosure, for example, the gate signal generator may generate the gate signal as a sine wave such that a harmonic component of the gate signal as a sine wave becomes lower by 10 dB or more than the maximum value of a harmonic component of the gate signal as a square wave.

In this case, the reception at the receiver can be made less affected, and greater flexibility in the design of the gate signal generator can be allowed.

A control method according to one aspect of the present disclosure is used for a display device including multiple gate lines and multiple common electrodes used for both image display and touch detection, and the control method includes:

generating a gate signal as a sine wave; and outputting the gate signal generated in the generating to the multiple gate lines.

According to this aspect, using a gate signal as a sine wave, the magnitude of harmonics of the gate signal can be reduced, compared to the case of a square wave. Accordingly, the interference of harmonics of the gate signal with a signal received at the receiver can be restrained, without adding an electrode for shielding in the display device. Therefore, the reception at the receiver can be made less affected, without degrading the accuracy and sensitivity of touch position detection.

A display system according to one aspect of the present disclosure includes:

a display device that includes multiple gate lines and multiple common electrodes used for both image display and touch detection; and a control device that controls the display device, and the control device includes:

a gate signal generator that generates a gate signal as a sine wave; and an output unit that outputs the gate signal generated by the gate signal generator to the multiple gate lines.

According to this aspect, using a gate signal as a sine wave, the magnitude of harmonics of the gate signal can be reduced, compared to the case of a square wave. Accordingly, the interference of harmonics of the gate signal with a signal received at the receiver can be restrained, without adding an electrode for shielding in the display device. Therefore, the reception at the receiver can be made less affected, without degrading the accuracy and sensitivity of touch position detection.

While various embodiments have been described herein above, it is to be appreciated that various changes in form and detail may be made without departing from the spirit and scope of the invention(s) presently or hereafter claimed.

What is claimed is:

1. A display system, comprising:
    a display device comprising a plurality of gate lines and a plurality of common electrodes, the display device used for both image display and touch detection; and
    a control device that controls the display device, the control device including a drive circuit that generates a gate signal as at least a sine wave, and outputs the gate signal to the plurality of gate lines, wherein
    when a specific frequency at which harmonics need to be restrained and a frequency of the gate signal satisfy a changing condition, the drive circuit generates the gate signal as the sine wave, and
    when the specific frequency and the frequency of the gate signal do not satisfy the changing condition, the drive circuit generates the gate signal as a square wave.

2. The display system according to claim 1, wherein the drive circuit generates the gate signal as the sine wave having an amplitude that is larger than an amplitude of the gate signal as the square wave.

3. The display system according to claim 1, wherein the drive circuit generates the gate signal as the sine wave having a frequency that is lower than a frequency of the gate signal as the square wave.

4. The display system according to claim 1, wherein the drive circuit generates the gate signal as the sine wave that contains a direct-current component.

5. The display system according to claim 4, wherein
    each of the plurality of gate lines is connected to a plurality of pixel switching elements, and
    ON time of the plurality of pixel switching elements driven by the gate signal as the sine wave is identical with ON time of the plurality of pixel switching elements driven by the gate signal as the square wave.

6. The display system according to claim 1, wherein the drive circuit generates the gate signal as the sine wave such that a harmonic component of the gate signal as the sine wave becomes lower by 10 dB or more than a maximum value of the harmonic component of the gate signal as the square wave.

7. A control device for controlling a display device, the display device including a plurality of gate lines and a plurality of common electrodes, the display device used for both image display and touch detection, the control device comprising:
    a drive circuit that generates a gate signal as at least a sine wave, wherein
    the control device outputs the gate signal to the plurality of gate lines,
    when a specific frequency at which harmonics need to be restrained and a frequency of the gate signal satisfy a changing condition, the drive circuit generates the gate signal as the sine wave, and,
    when the specific frequency and the frequency of the gate signal do not satisfy the changing condition, the drive circuit generates the gate signal as a square wave.

8. The control device according to claim 7, wherein the drive circuit generates the gate signal as the sine wave having an amplitude that is larger than an amplitude of the gate signal as the square wave.

9. The control device according to claim 7, wherein the drive circuit generates the gate signal as the sine wave having a frequency that is lower than a frequency of the gate signal as the square wave.

10. The control device according to claim 7, wherein the drive circuit generates the gate signal as the sine wave that contains a direct-current component.

11. The control device according to claim 10, wherein
    each of the plurality of gate lines is connected to a plurality of pixel switching elements, and
    ON time of the plurality of pixel switching elements driven by the gate signal as the sine wave is identical with ON time of the plurality of pixel switching elements driven by the gate signal as the square wave.

12. The control device according to claim 7, wherein the drive circuit generates the gate signal as the sine wave such that a harmonic component of the gate signal as the sine wave becomes lower by 10 dB or more than a maximum value of the harmonic component of the gate signal as the square wave.

13. A control method for a display device, the display device including a plurality of gate lines and a plurality of common electrodes, the display device used for both image display and touch detection, the control method comprising:
    generating a gate signal as at least a sine wave; and
    outputting the gate signal generated in the generating to the plurality of gate lines, wherein
    when a specific frequency at which harmonics need to be restrained and a frequency of the gate signal satisfy a changing condition, the generating generates the gate signal as the sine wave, and,
    when the specific frequency and the frequency of the gate signal do not satisfy the changing condition, the generating generates the gate signal as a square wave.

* * * * *